United States Patent
Okabe et al.

(10) Patent No.: US 11,772,737 B2
(45) Date of Patent: Oct. 3, 2023

(54) BATTERY ATTACHING/DETACHING STRUCTURE FOR SADDLE-TYPE VEHICLE

(71) Applicant: HONDA MOTOR CO., LTD., Tokyo (JP)

(72) Inventors: Sadataka Okabe, Wako (JP); Akira Sato, Wako (JP); Shunichi Nakabayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 320 days.

(21) Appl. No.: 17/279,444

(22) PCT Filed: Sep. 27, 2018

(86) PCT No.: PCT/JP2018/036095
§ 371 (c)(1),
(2) Date: Mar. 24, 2021

(87) PCT Pub. No.: WO2020/065868
PCT Pub. Date: Apr. 2, 2020

(65) Prior Publication Data
US 2022/0033024 A1 Feb. 3, 2022

(51) Int. Cl.
*H01M 50/249* (2021.01)
*B62J 43/23* (2020.01)
(Continued)

(52) U.S. Cl.
CPC .............. *B62J 43/23* (2020.02); *B60L 50/66* (2019.02); *B60L 53/80* (2019.02); *B62J 43/16* (2020.02);
(Continued)

(58) Field of Classification Search
CPC ...... B60K 1/00; B60K 1/04; B62J 9/14; B62J 1/00; B62J 43/23; B62J 43/16;
(Continued)

(56) References Cited

U.S. PATENT DOCUMENTS

| 9,545,968 B2 * | 1/2017 | Miyashiro ................ B62J 43/28 |
| 10,611,425 B2 | 4/2020 | Miyashiro et al. |
| 2015/0122569 A1 | 5/2015 | Miyashiro et al. |

FOREIGN PATENT DOCUMENTS

| CN | 102030056 B | 2/2013 |
| CN | 103241337 A | 8/2013 |

(Continued)

OTHER PUBLICATIONS

Office action dated Oct. 29, 2021 in the corresponding Chinese Patent Application No. 201880098073.5 with a partial English translation thereof.

(Continued)

*Primary Examiner* — Jason D Shanske
*Assistant Examiner* — James J Triggs
(74) *Attorney, Agent, or Firm* — Carrier, Shende & Associates P.C.; Fulchand P. Shende; Joseph P. Carrier

(57) ABSTRACT

A battery attaching/detaching structure for a saddle-type vehicle including: a plurality of substantially rectangular parallelepiped batteries for supplying electric power to a power source of the saddle-type vehicle; a battery case in which the batteries are stored; battery-side terminals provided on lower surfaces of the batteries; and case-side terminals engaged with the battery-side terminals, comprises terminal holders that support the case-side terminals such that the case-side terminals are movable between a connected position where the case-side terminals are connected to the battery-side terminals and a retracted position where the case-side terminals are separated from the battery-side terminals. Between the case-side terminals and the terminal holders, springs for urging the case-side terminals in a direction of pressing the battery-side terminals are disposed. Such battery attaching/detaching structure is capable of limiting the movement of a stored battery and maintaining (Continued)

good electrical connection between a battery-side terminal and a case-side terminal.

10 Claims, 30 Drawing Sheets

(51) Int. Cl.
| | |
|---|---|
| *B60L 50/60* | (2019.01) |
| *B60L 53/80* | (2019.01) |
| *B62J 43/16* | (2020.01) |
| *H01M 50/296* | (2021.01) |
| *H01M 50/289* | (2021.01) |
| *H01M 10/04* | (2006.01) |

(52) U.S. Cl.
CPC ..... *H01M 10/0481* (2013.01); *H01M 50/249* (2021.01); *H01M 50/289* (2021.01); *H01M 50/296* (2021.01); *H01M 2220/20* (2013.01)

(58) Field of Classification Search
CPC .......... B60L 50/64; B60L 50/66; B60L 53/80; H01M 10/0481; H01M 50/249; H01M 50/289; H01M 50/296; H01M 2220/20
See application file for complete search history.

(56) References Cited

FOREIGN PATENT DOCUMENTS

| | | |
|---|---|---|
| CN | 107636856 A | 1/2018 |
| EP | 2 280 436 A2 | 2/2011 |
| EP | 2 302 716 A1 | 3/2011 |
| EP | 2 623 404 A1 | 8/2013 |
| EP | 3 067 259 A1 | 9/2016 |
| EP | 3 670 311 A1 | 6/2020 |
| JP | H11-129959 A | 5/1999 |
| JP | 2011-049151 A | 3/2011 |
| JP | 2013-208935 A | 10/2013 |
| TW | 374391 U | 11/1999 |
| WO | 2012/043518 A1 | 4/2012 |
| WO | 2014/154295 A1 | 10/2014 |
| WO | 2015/068753 A1 | 5/2015 |

OTHER PUBLICATIONS

Extended European search report dated Sep. 14, 2021 in the corresponding EP Patent Application 18935576.1.
PCT/ISA/210/220/237 from International Application PCT/JP2018036095.
Office Action issued in the corresponding National Phase Patent Application No. 10920344640.

\* cited by examiner

BATTERY ATTACHING/DETACHING STRUCTURE FOR SADDLE-TYPE VEHICLE

TECHNICAL FIELD

The present invention relates to a battery attaching/detaching structure for a saddle-type vehicle, and more particularly to a battery attaching/detaching structure for a saddle-type vehicle applicable to a portable battery detachably stored in a body of the saddle-type electric vehicle and a battery storage portion.

BACKGROUND ART

In recent years, a saddle-type electric vehicle that travels by driving a motor with electric power supplied from an on-board battery has been developed. In such a saddle-type electric vehicle, a configuration in which a portable battery detachable from a vehicle body is used to facilitate charging, maintenance, and the like is also well known.

Patent Literature 1 discloses a configuration of a scooter-type electric vehicle having a low floor between a steering handle and a seat, in which two batteries are stored below an openable/closable seat. In this configuration, the two batteries having a substantially rectangular parallelepiped shape elongated in the vertical direction of the vehicle body are stored in two storing recesses arranged adjacent to each other in the longitudinal direction of the vehicle body, and when the batteries are stored in predetermined positions, the connection terminals on the battery side and the connection terminals on the vehicle body side are engaged with each other.

CITATION LIST

Patent Literature

Patent Literature 1: WO 2012/043518 A1

SUMMARY OF INVENTION

Technical Problem

Here, in the configuration in which connection terminals are engaged by storing batteries in storing recesses as in Patent Literature 1, it is preferable to provide a mechanism for holding the stored batteries at predetermined positions so that the batteries do not move in the upward direction of the vehicle body and then do not affect the electrical connection when, for example, the vehicle rides over a large level difference. In this regard, there has been a demand for a configuration capable of maintaining a good electrical connection while holding batteries in predetermined positions by a holding mechanism.

It is an object of the present invention to solve the problems of the above-described prior art and provide a battery attaching/detaching structure for a saddle-type vehicle capable of limiting the movement of a stored battery and of maintaining good electrical connection between a battery-side terminal and a case-side terminal.

Solution to Problem

In order to achieve the above-described object, the present invention has a first feature in that a battery attaching/detaching structure for a saddle-type vehicle, including a plurality of substantially rectangular parallelepiped batteries (B) for supplying electric power to a power source of the saddle-type vehicle (1); a battery case (40) in which the batteries (B) are stored; battery-side terminals (75) provided on lower surfaces (107) of the batteries (B); and case-side terminals (90) engaged with the battery-side terminals (75), comprises terminal holders (74) that support the case-side terminals (90) such that the case-side terminals (90) are movable between a connected position (U) where the case-side terminals (90) are connected to the battery-side terminals (75) and a retracted position (D) where the case-side terminals (90) are separated from the battery-side terminals (75), wherein between the case-side terminals (90) and the terminal holders (74), springs (97) for urging the case-side terminals (90) in a direction of pressing the battery-side terminals (75) are disposed.

The present invention has a second feature in that the battery attaching/detaching structure for a saddle-type vehicle further includes: a single operation lever (60) that, when pushed downward in a state where the batteries (B) are stored in the battery case (40), limits vertical movement of the batteries (B); and a link mechanism (L) that connects the operation lever (60) and the terminal holders (74).

The present invention has a third feature in that the operation lever (60) is configured to be vertically slidable along a longitudinal direction of the batteries (B), and the battery attaching/detaching structure for a saddle-type vehicle further includes a pressing holder (45) that is swingable and presses upper surfaces (102) of the batteries (60) when the operation lever (60) is moved to a lowermost position.

The present invention has a fourth feature in that the battery case (40) is disposed below a seat (23) that is openable/closable and that is provided in the saddle-type vehicle (1), and a boss (84) positioned above the operation lever (60) is provided on a bottom surface of the seat (23).

The present invention has a fifth feature in that the boss (84) is not in contact with the operation lever (60) in a state where the operation lever (60) is pushed down to a predetermined lowermost position.

The present invention has a sixth feature in that the terminal holders (74) are plate members that are substantially U-shaped and cover lower portions of the case-side terminals (90), the terminal holders (74) and the case-side terminals (90) are configured to be slidable in a vertical direction when support shafts (98) that are cylindrical and extend downward from lower surfaces of the terminal holders (74) are inserted into through holes (74a) formed in the terminal holders (74), and the springs (97) are coil springs wound around the support shafts (98).

The present invention has a seventh feature in that the support shafts (98), around which the springs (97) are wound, are provided as pairs each with a corresponding one of the case-side terminals (90) interposed therebetween.

The present invention has an eighth feature in that the number of the batteries (B) is two and the batteries (B) are arranged side by side, and the battery attaching/detaching structure for a saddle-type vehicle further includes: a single operation lever (60) that, when pushed downward in a state where the batteries (B) are stored in the battery case (40), limits vertical movement of the batteries (B); and the terminal holders (74) provided for the two respective batteries (60) are connected to the operation lever (60).

Effects of Invention

According to the first feature, the battery attaching/detaching structure for a saddle-type vehicle, including a plurality of substantially rectangular parallelepiped batteries (B) for supplying electric power to a power source of the saddle-type vehicle (1); a battery case (40) in which the batteries (B) are stored; battery-side terminals (75) provided on lower surfaces (107) of the batteries (B); and case-side terminals (90) engaged with the battery-side terminals (75), comprises terminal holders (74) that support the case-side terminals (90) such that the case-side terminals (90) are movable between a connected position (U) where the case-side terminals (90) are connected to the battery-side terminals (75) and a retracted position (D) where the case-side terminals (90) are separated from the battery-side terminals (75), wherein between the case-side terminals (90) and the terminal holders (74), springs (97) for urging the case-side terminals (90) in a direction of pressing the battery-side terminals (75) are disposed. Thus, it is possible to generate a pressing force for pressing the case-side terminals against the battery-side terminals in a state where the case-side terminals are moved to the connected position. As a result, even when the batteries move in the upward direction of the vehicle body when, for example, the vehicle rides over a large level difference, the electrical connection can be maintained by causing the case-side terminals to follow the movement of the batteries.

According to the second feature, the battery attaching/detaching structure for a saddle-type vehicle further includes: a single operation lever (60) that, when pushed downward in a state where the batteries (B) are stored in the battery case (40), limits vertical movement of the batteries (B); and a link mechanism (L) that connects the operation lever (60) and the terminal holders (74). Thus, the vertical movement of the batteries can be limited by the single operation lever, and the attaching and detaching operation of the batteries is facilitated. In addition, since the link mechanism includes a plurality of rotation shafts, even when an ineffective stroke occurs in the motion of the operation lever, the springs absorb the ineffective stroke after the case-side terminals and the battery-side terminals come into contact with each other, so that preloading can be effectively applied to both terminals.

According to the third feature, the operation lever (60) is configured to be vertically slidable along a longitudinal direction of the batteries (B), and the battery attaching/detaching structure for a saddle-type vehicle further includes a pressing holder (45) that is swingable and presses upper surfaces (102) of the batteries (60) when the operation lever (60) is moved to a lowermost position. Thus, by pushing the operation lever down, the case-side terminals are pressed against the battery-side terminal by the urging force of the springs, and also the upper surfaces of the batteries are pressed by the pressing holder, facilitating maintenance of electrical connection between the terminals.

According to the fourth feature, the battery case (40) is disposed below a seat (23) that is openable/closable and that is provided in the saddle-type vehicle (1), and a boss (84) positioned above the operation lever (60) is provided on a bottom surface of the seat (23). Thus, when the seat is closed in a state where the operation lever is above a predetermined lowermost position, the operation lever can be pushed down by the boss.

According to the fifth feature, the boss (84) is not in contact with the operation lever (60) in a state where the operation lever (60) is pushed down to the predetermined lowermost position. Thus, when the seat is closed, if the operation lever is not pushed down sufficiently, the boss comes into contact with the operation lever to push the operation lever down at least to an allowable position, and if the operation lever is pushed down to the predetermined lowest position, the boss is not in contact with the operation lever, whereby the operation lever sufficiently pushed down to the predetermined lowermost position can be prevented from being further applied with a load.

According to the sixth feature, the terminal holders (74) are plate members that are substantially U-shaped and cover lower portions of the case-side terminals (90), the terminal holders (74) and the case-side terminals (90) are configured to be slidable in a vertical direction when support shafts (98) that are cylindrical and extend downward from lower surfaces of the terminal holders (74) are inserted into through holes (74a) formed in the terminal holders (74), and the springs (97) are coil springs wound around the support shafts (98). Thus, the case-side terminals can be urged to the battery side with a simple configuration.

According to the seventh feature, the support shafts (98), around which the springs (97) are wound, are provided as pairs each with a corresponding one of the case-side terminals (90) interposed therebetween. Thus, when sliding mechanisms of the terminal holder are provided on both sides of each of the case-side terminal, the inclination of the case-side terminals is prevented and a smooth sliding motion is enabled. As a result, good electrical connection can be maintained between the case-side terminals and the battery-side terminals.

According to the eighth feature, the number of the batteries (B) is two and the batteries (B) are arranged side by side, and the battery attaching/detaching structure for a saddle-type vehicle further includes: a single operation lever (60) that, when pushed downward in a state where the batteries (B) are stored in the battery case (40), limits vertical movement of the batteries (B); and the terminal holders (74) provided for the two respective batteries (60) are connected to the operation lever (60). The tolerance may become large because the terminal holders are provided for the two respective batteries, but since the springs are provided between the case-side terminals and the terminal holders, it is easy to set an arbitrary stroke amount according to an assumed tolerance.

DESCRIPTION OF EMBODIMENTS

Figure 1:
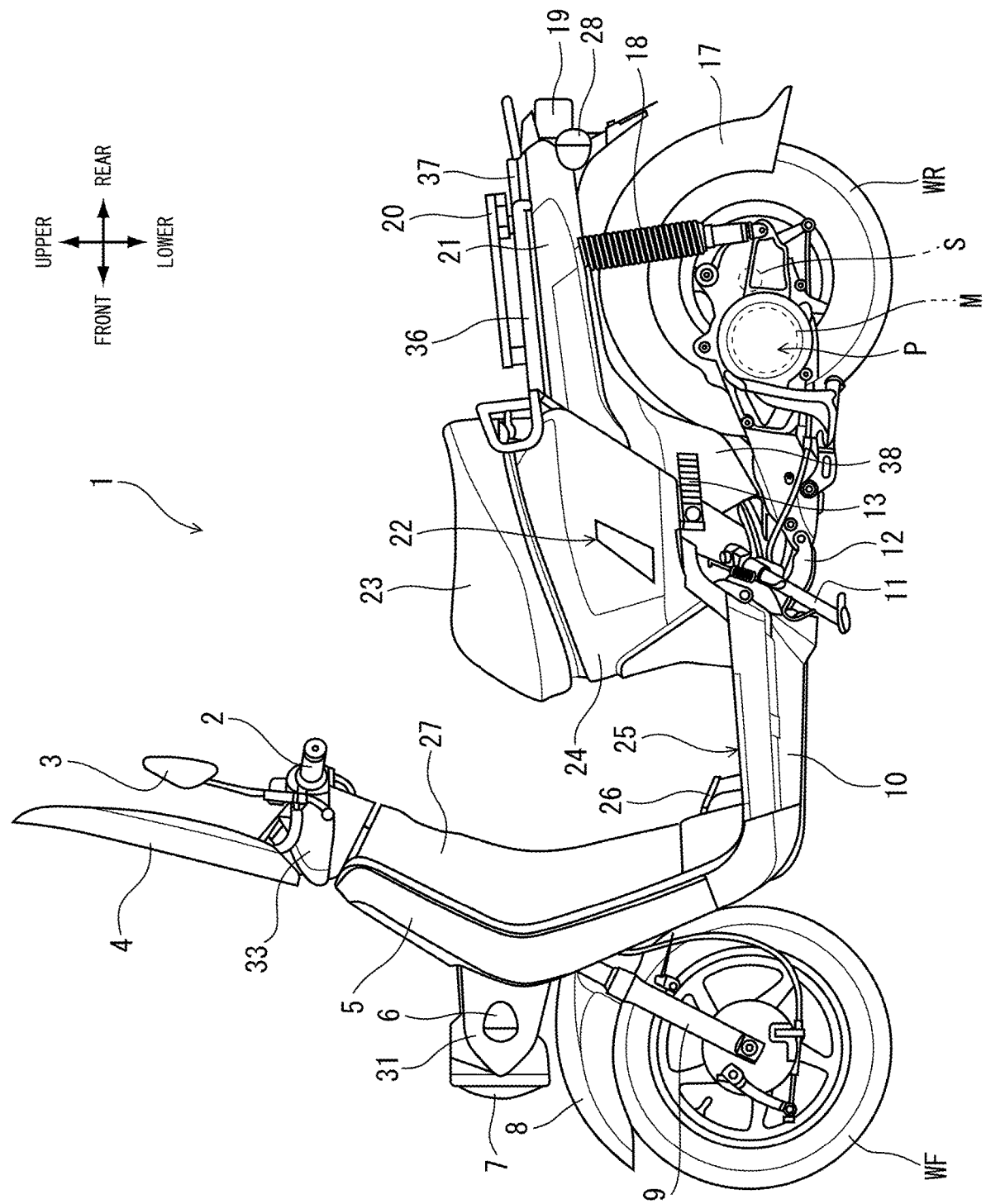
FIG. 1 is a left side view of an electric motorcycle as a saddle-type electric vehicle according to an embodiment of the present invention.

Hereinafter, a preferred embodiment of the present invention will be described in detail with reference to the drawings. FIG. 1 is a left side view of an electric motorcycle 1 as a saddle-type electric vehicle according to an embodiment of the present invention. The electric motorcycle 1 is a so-called scooter-type electric vehicle provided with a low floor 25, on which a rider places his or her feet, between a steering handle 2 and a seat 23.

A pair of left and right front forks 9 in the vehicle width direction for pivotally supporting a front wheel WF in a rotatable manner is configured to be swingable by a steering handle 2 extending in the vehicle width direction. A rearview mirror 3 and a windshield screen 4 are attached to a handle cover 33 covering the front and rear of the steering handle 2. Below the handle cover 33, a front cover 5 covering the front side of a front side part of the vehicle body and a floor panel 27 covering the rear side of the front side part of the vehicle body and facing legs of a rider are disposed. In front of the front cover 5, a headlight 7 supported by a light stay 31 and a pair of left and right front blinker devices 6 is disposed. A front fender 8 covering the upper portion of the front wheel WF is supported between the left and right front forks 9.

A brake pedal 26 for operating the brake of a rear wheel WR is disposed on the upper surface of the low floor 25, and an under cover 10 connected to the lower end portion of the front cover 5 is disposed below the low floor 25. Below the seat 23 on which a driver sits, an under-seat cowl 24 having a curved shape that is convex toward the front of the vehicle body is disposed. In the under-seat cowl 24, a pair of left and right slits 22 for proactively taking in the traveling wind from the front side of the vehicle body is formed.

Below the under-seat cowl 24, a side stand 11 and a tandem step 13 are disposed. At a position rearward of the under-seat cowl 24, a pair of rear cowls 21 in the vehicle width direction is disposed, and above the rear cowl 21, a luggage carrier 37 surrounded by a grip pipe 36 and a rear carrier 20 attached to the upper surface of the luggage carrier 37 are disposed. At a position rearward of the rear cowl 21, a tail light 19 and rear blinker devices 28 are disposed.

At a position rearward of the under cover 10, a swing unit-type power unit P which pivotally supports the rear wheel WR in a rotatable manner with an axle S and incorporates a motor M for driving the rear wheel WR is attached to the vehicle body frame in a swingable manner via a link mechanism 12. A rear portion of the power unit P is suspended from the vehicle body frame by a rear cushion 18, and a rear fender 17 for covering an upper portion of the rear wheel WR is attached to an upper portion of the power unit P.

A cover member 38 for receiving traveling wind introduced through the slits 22 in the under-seat cowl 24 and the traveling wind flowing inside the under cover 10 is disposed at a position between the under-seat cowl 24 and the rear fender 17.

Figure 2:
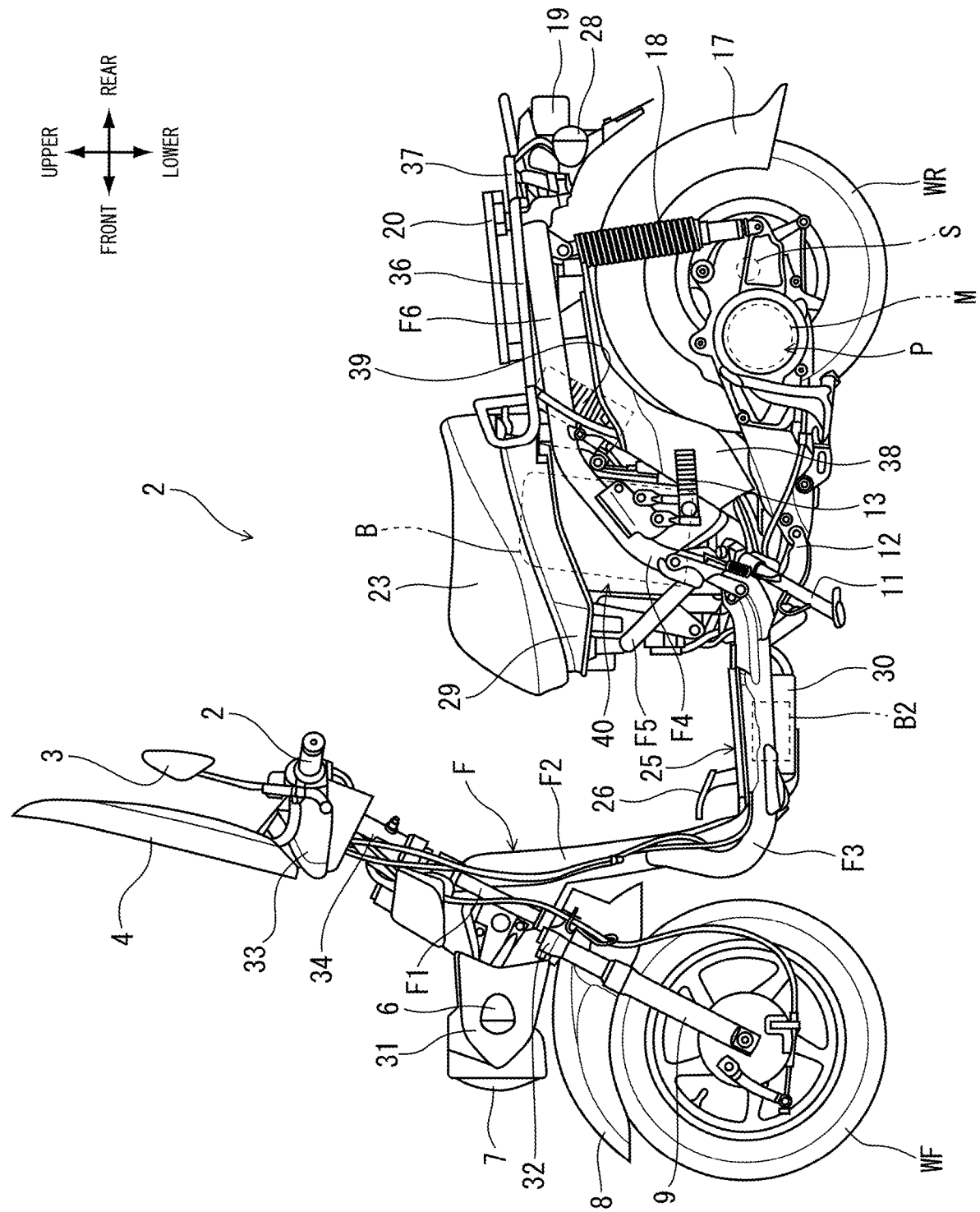
FIG. 2 is a left side view of the electric motorcycle with main exterior components removed.

FIG. 2 is a left side view of the electric motorcycle 1 with main exterior components removed. The vehicle body frame F of the electric motorcycle 1 includes a main frame F2 that extends downward of the vehicle body from a head pipe F1 and that is at the center in the vehicle width direction, a pair of left and right underframes F3 that are connected to the lower end portion of the main frame F2 and curve rearward of the vehicle body, rising portions F4 that rise upward of the vehicle body from the rear end portions of the underframes F3, and a pair of left and right rear frames F6 connected to the rising portions F4 and extending rearward of the vehicle body. To front portions of the rising portions F4, a curved pipe F5 connecting the left and right rising portions F4 is connected.

The head pipe F1 pivotally supports a steering stem 34 in a rotatable manner. To an upper end portion of the steering stem 34, the steering handle 2 is fixed, and to a lower end portion, on the other hand, of the steering stem 34, a bottom bridge 32 supporting upper end portions of the front forks 9 is fixed. Below the seat 23, there is disposed a battery case 40 for storing two batteries (high voltage batteries) B for supply electric power to a motor M in a state where the batteries are arranged side by side in the vehicle width direction. The rated voltage of the batteries B is, for example, 48 V. The seat 23 is pivotally supported by an upper front end portion of the battery case 40 so as to be openable and closable, and functions as an openable/closable lid of the battery case 40.

The battery case 40 is stored in a space rearward of the curved pipe F5 and between the pair of left and right rising portions F4. The under-seat cowl 24 (see FIG. 1) extends from the front of the curved pipe F5 to the side of the left and right rising portions F4 so as to cover the front and side of the battery case 40. Below the low floor 25, a storage case 30 for storing a low voltage sub-battery B2 for supplying electric power to auxiliary devices such as the headlight 7 and electrical components such as a fuse are disposed. The rated voltage of the sub-battery B2 is, for example, 12 V.

The cover member 38 for receiving traveling wind from the front of the vehicle body at the front of the rear fender 17 is disposed on the rear surface side of the battery case 40, and a power control unit (PCU) 39 for controlling the electric power supply to the motor M is disposed at a position near to an upper portion of the rear surface side of the battery case 40.

Figure 3:
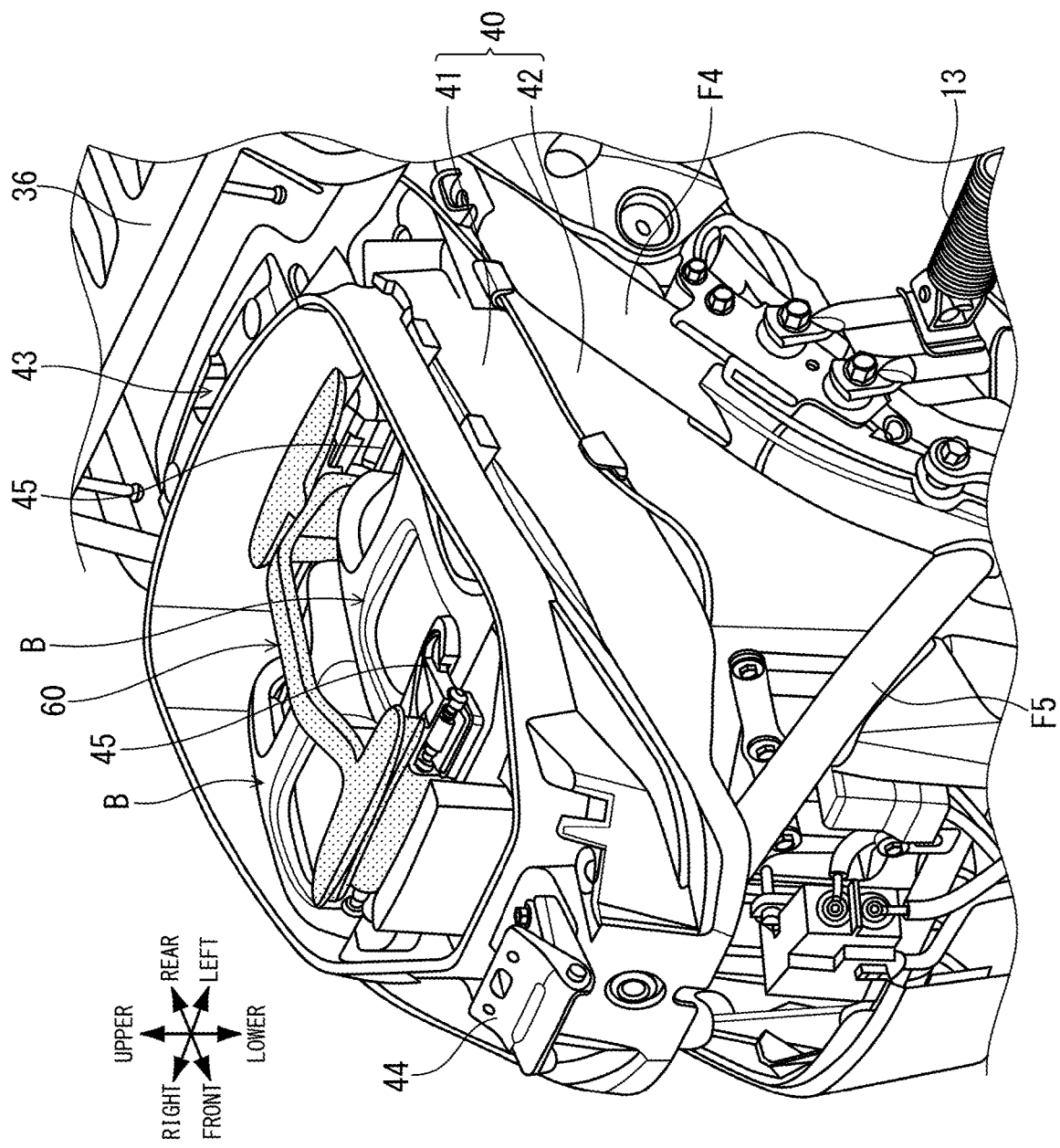
FIG. 3 is an enlarged perspective view of a part of the electric motorcycle with a seat and an under-seat cowl removed.

FIG. 3 is an enlarged perspective view of a part of the electric motorcycle 1 with the seat 23 and the under-seat cowl 24 removed. This figure illustrates the motorcycle 1 viewed from the upper front side of the left side of the vehicle body. The battery case 40 made from a hard resin or the like includes a lower case 42 having a bottomed box shape, and an upper case 41 engaged with an upper portion of the lower case 42. At the upper front end portion of the upper case 41, a hinge mechanism 44 for pivotally supporting the front end portion of the seat 23 in a swingable manner is provided. At the upper rear end portion of the upper case 41, a hook opening 43 for allowing a hook to be engaged with a seat catch mechanism for locking the seat 23 in a closed state is provided.

The two batteries B are stored side by side in the vehicle width direction, and an operation lever 60 (dot hatched area), which is gripped and operated by a rider is disposed at a position between the left and right batteries B. Below the operation lever 60, pressing holders 45 that are in contact with the upper surfaces of the batteries B are disposed.

Figure 4:
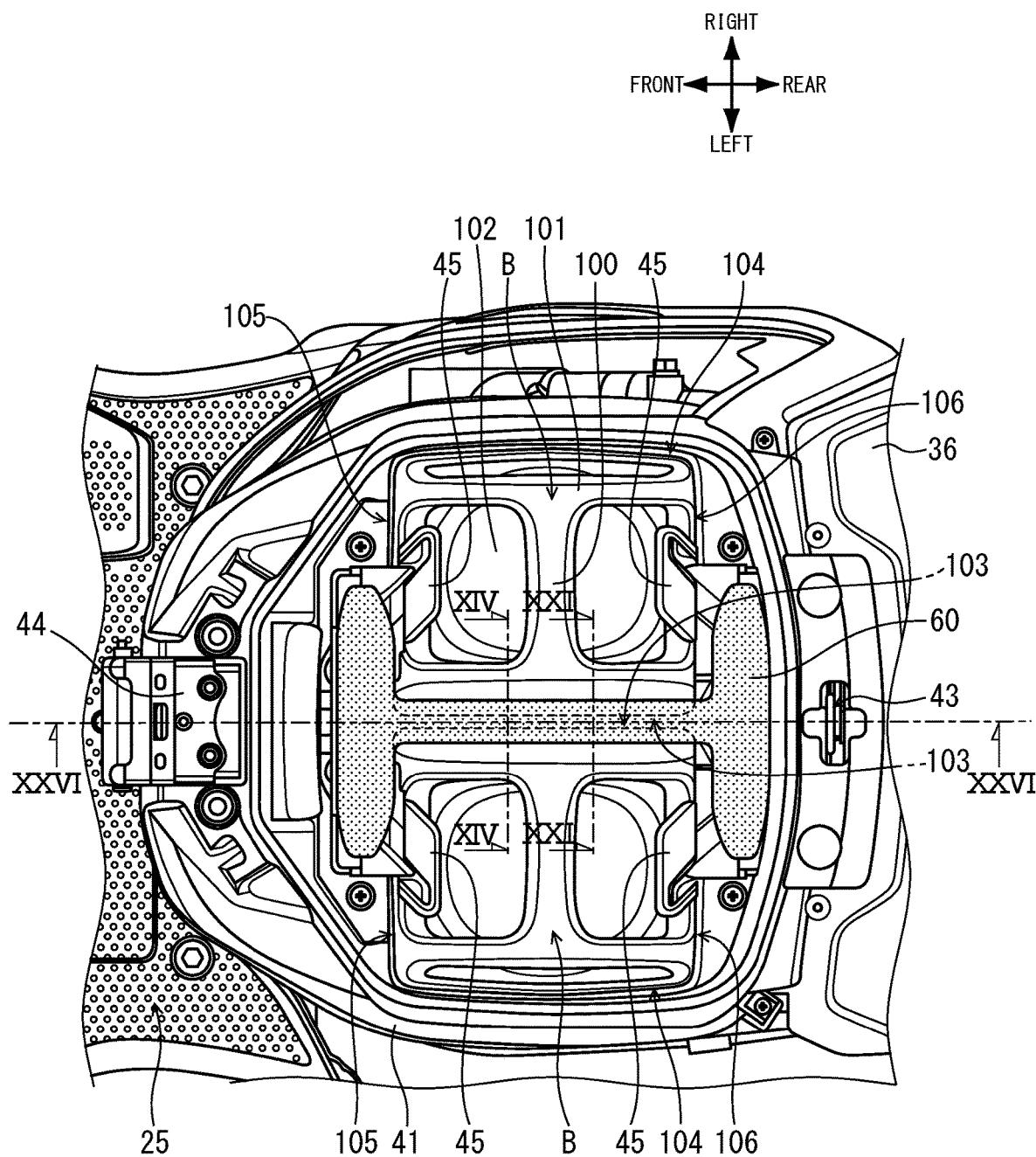
FIG. 4 is a plan view of a battery case.
Figure 5:
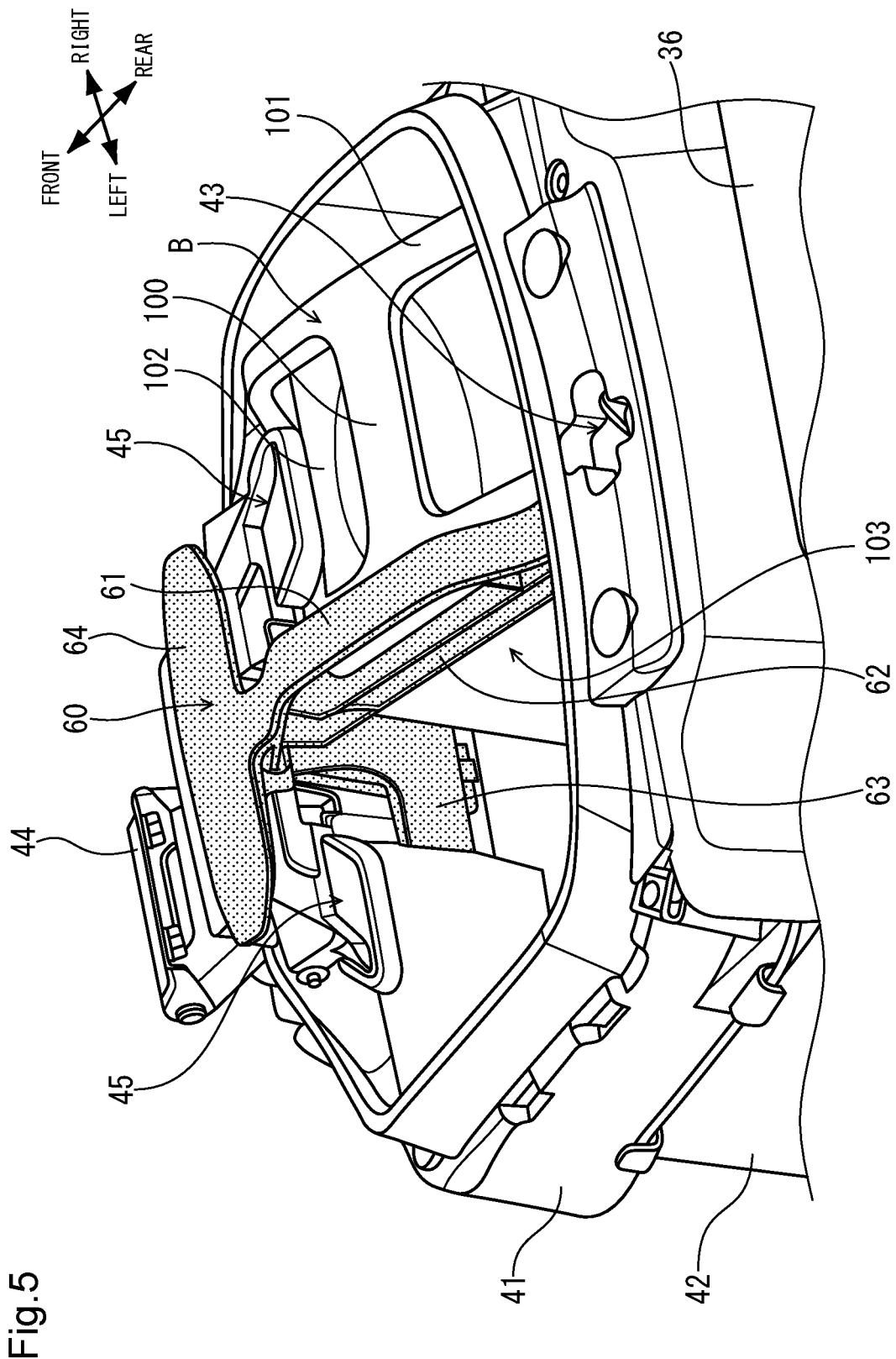
FIG. 5 is a perspective view of the battery case in a state where a battery on the left side in the vehicle width direction is detached.

FIG. 4 is a plan view of the battery case 40. FIG. 5 is a perspective view of the battery case 40 in a state where the battery B on the left side in the vehicle width direction is detached. FIG. 5 illustrates the battery case 40 viewed from the upper rear side of the left side of the vehicle body. The left and right batteries B arranged side by side in the vehicle width direction have the same shape and structure. A first side surface 104, which faces outside in the vehicle width direction, of each of the batteries B is formed from a curved plane that is convex outward in the vehicle width direction, whereas a second side surface 103 facing inside in the vehicle width direction, a third side surface 105 and the fourth side surface 106 facing the front side and the rear side of the vehicle body are formed as flat planes.

A first grip 100 extending in the vehicle width direction and a second grip 101 that is formed continuously from the first grip 100 and extends in the longitudinal direction of the vehicle body are formed at the upper end portion of the battery B. An upper surface 102 of the battery B located below the first grip 100 and the second grip 101 has a conical concave shape to increase the distance between the upper surface 102 and the grips 100 and 101, which facilitates gripping of the grips 100 and 101.

The operation lever 60 is disposed between the left and right batteries B and at the center in the vehicle width direction. The pressing holders 45 for pressing the upper surfaces 102 of the batteries B are provided on the front side and the rear side of each of the batteries B, and thus the number of provided pressing holders 45 is four as a total. The pressing holders 45 are pivotally supported at an upper part of the upper case 41 in a swingable manner, and are configured to press the upper surfaces 102 of the batteries B when the operation lever 60 is pushed downward.

Referring to FIG. 5, a grip portion 61 that extends in the longitudinal direction of the vehicle body and that is gripped by a rider is provided at an upper end portion of the operation lever 60, and a partition portion 62 inserted between the left and right batteries B is formed below the grip portion 61. In addition, pressing portions 64 extending in the vehicle width direction are formed at front and rear end portions of the grip portion 61. Further, positioning plates 63 positioned below the pressing portions 64 are formed at front and rear end portions of the partition portion 62.

Figure 6:
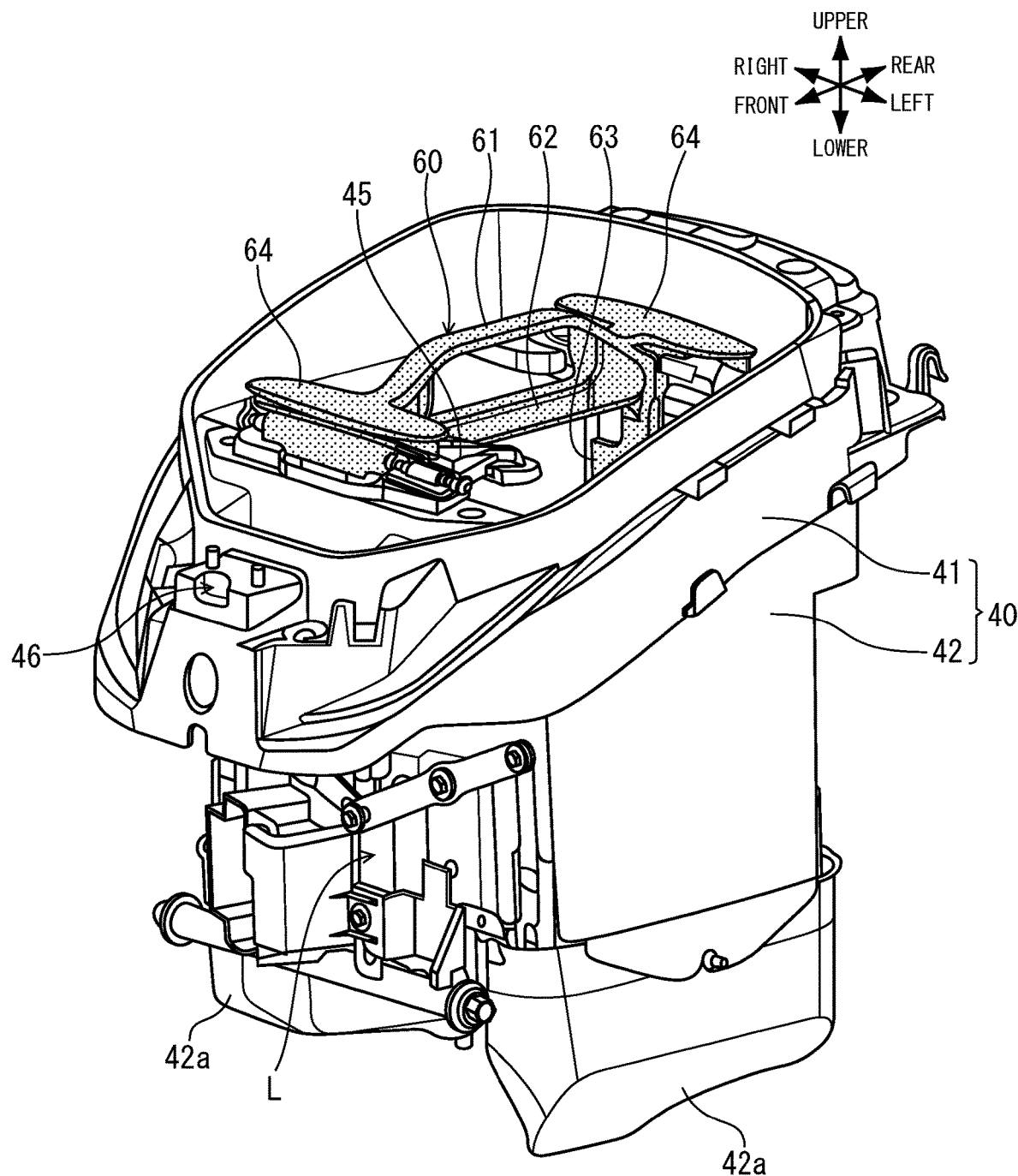
FIG. 6 is a perspective view of the battery case.

FIG. 6 is a perspective view of the battery case 40. In front of the lower case 42 in the longitudinal direction of the vehicle body, there is disposed a link mechanism L which operates in association with a vertical sliding motion of the operation lever 60 and which makes/breaks the electrical connection between the batteries B and the vehicle body side. At a lower end portion of the lower case 42, a pair of left and right terminal covers 42a for covering the connection portions of the terminals is provided. At an upper front end portion of the upper case 41, a pedestal 46, to which the hinge mechanism 44 is attached, is disposed.

Figure 7:
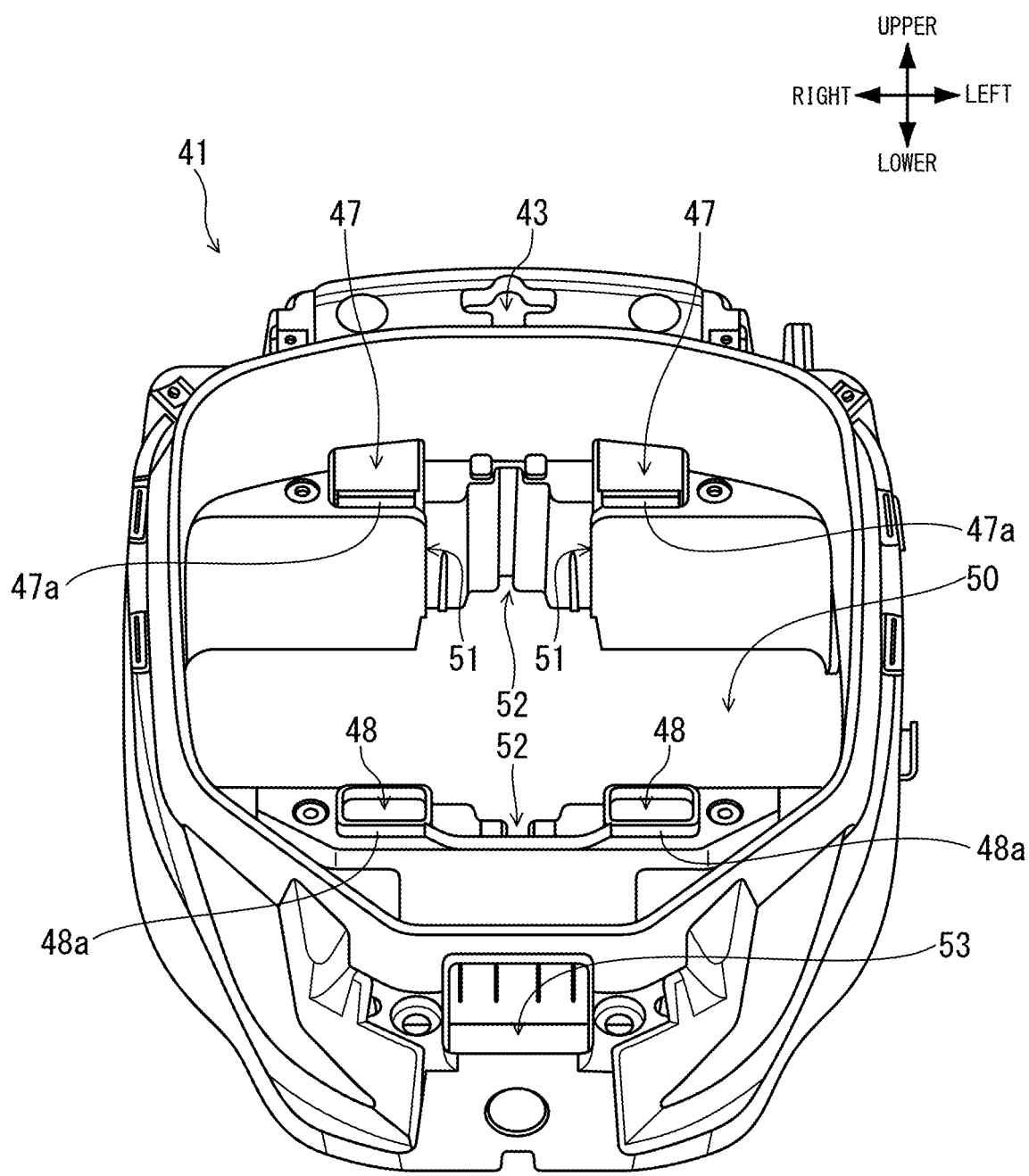
FIG. 7 is a perspective view of an upper case as viewed from the upper front side of the vehicle body.
Figure 8:
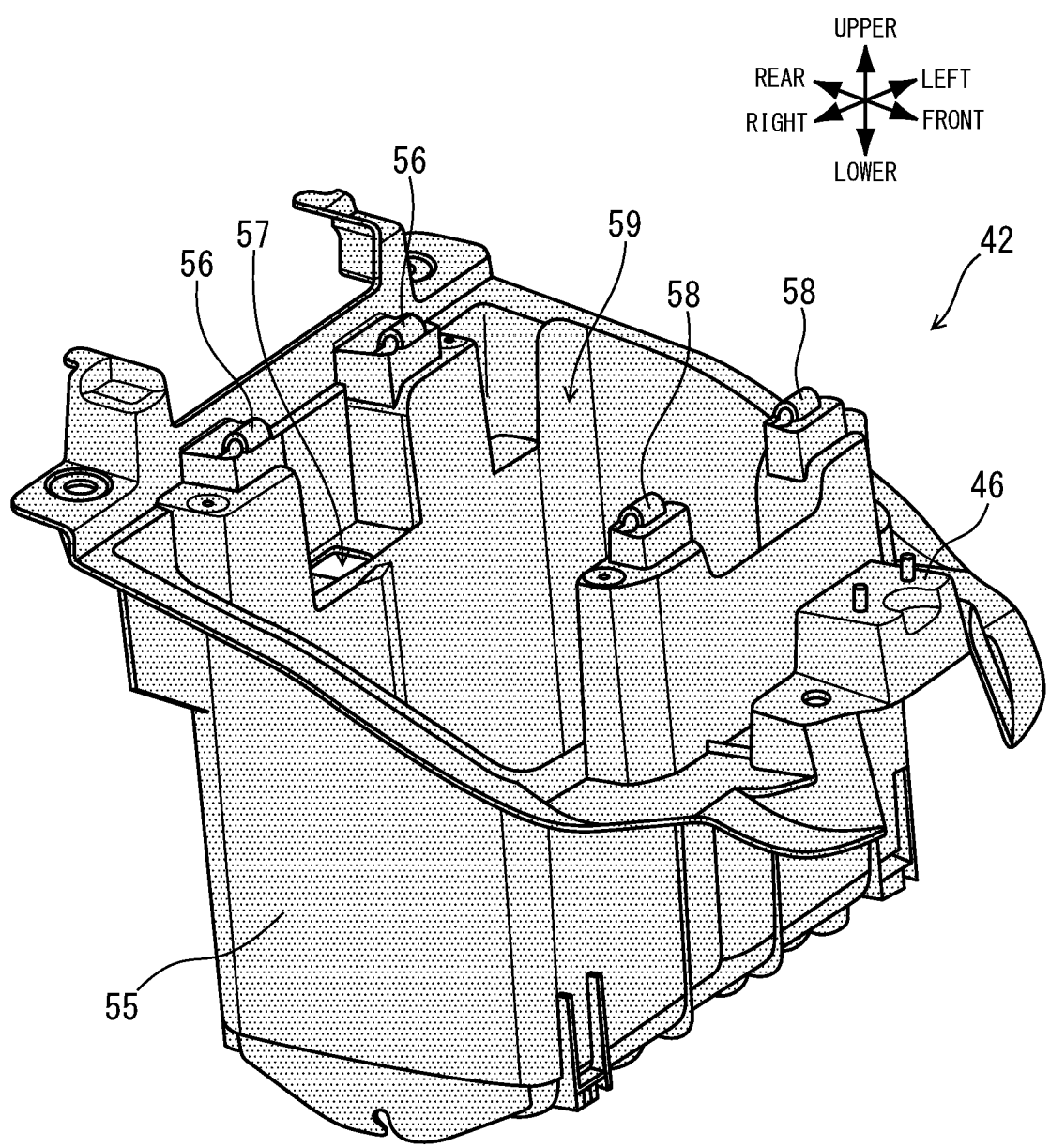
FIG. 8 is a perspective view of a lower case as viewed from the upper front side of the right side of the vehicle body.
Figure 9:
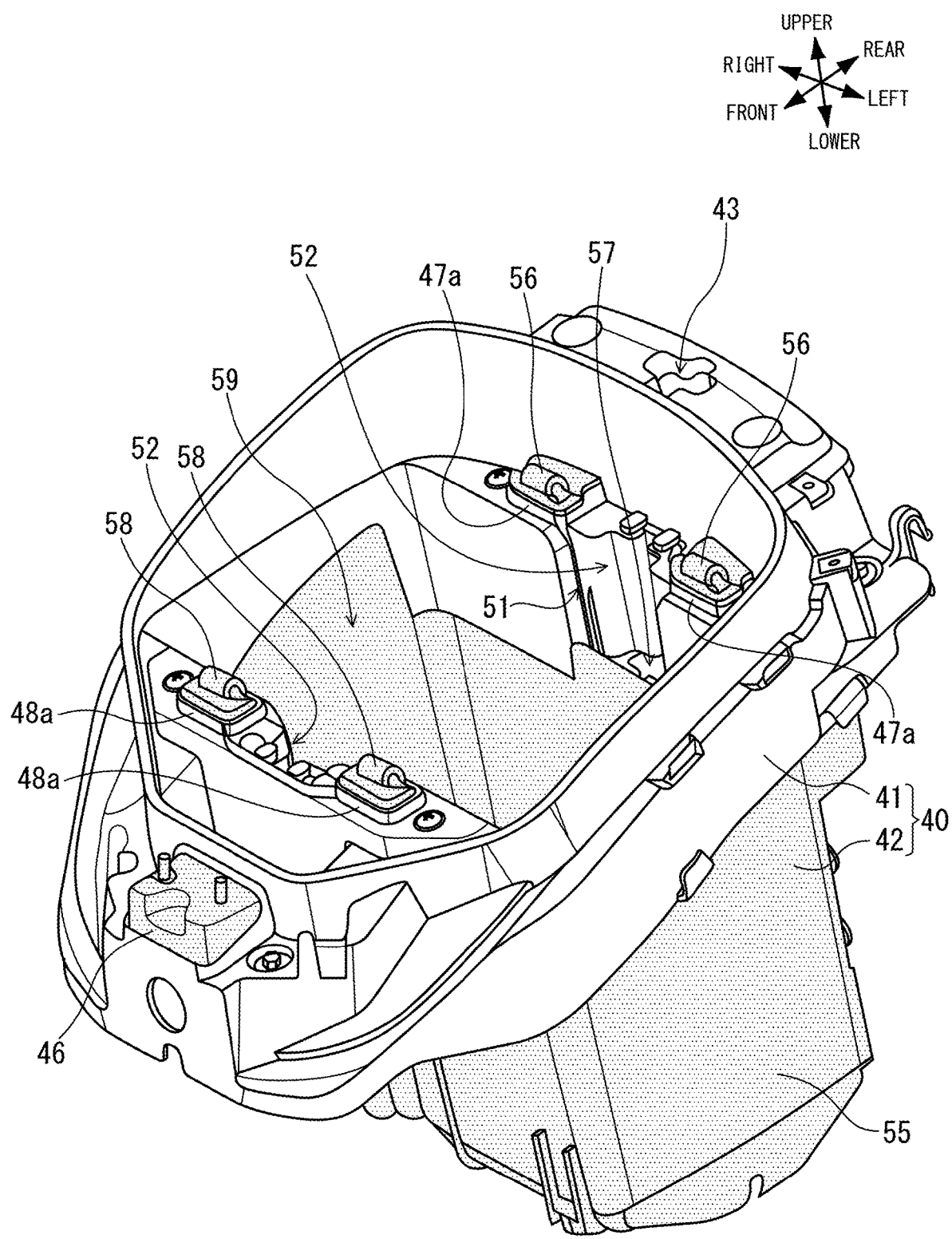
FIG. 9 is a perspective view of the battery case with an operation lever removed.

FIG. 7 is a perspective view of the upper case 41 as viewed from the upper front side of the vehicle body. FIG. 8 is a perspective view of the lower case 42 as viewed from the upper front side of the right side of the vehicle body, and FIG. 9 is a perspective view of the battery case 40 with the operation lever 60 removed.

As described above, the battery case 40 is formed by combining the upper case 41 and the lower case 42 (dot hatched area), and the upper case 41 has a central opening 50 through which the batteries B pass.

Support portions 56 and 58 for pivotally supporting the pressing holders 45 in a swingable manner are formed on the lower case 42, and are exposed above the vehicle body through rectangular openings 47 and 48 formed in the upper case 41 when the upper and lower cases 41 and 42 are engaged with each other. Similarly, the pedestal 46, to which the hinge mechanism 44 is attached, is also formed on the lower case 42, and is exposed above the vehicle body through a rectangular opening 53 formed in the upper case 41.

The hook opening 43 allowing an access to the seat catch mechanism is formed in a rear end portion of the upper case 41. The opening 47 and the opening 48 are surrounded by ribs 47a and 48a standing upward of the vehicle body. Between the left and right openings 47 and between the left and right openings 48, positioning recesses 52 in which the positioning plates 63 of the operation lever 60 are placed are formed. Tapered surfaces 51, which are the outer side surfaces of the positioning recesses 52 in the vehicle width direction, have a tapered shape that is narrower toward the lower side.

The main body portion 55 of the lower case 42 forms a bottomed recess 59 for storing the batteries B. A leg opening 57, into which a leg portion 66 (see FIG. 10) of the operation lever 60 is inserted, is formed between the support portions 56, which pivotally support the pressing holder 45. Another leg opening 57 is formed between the support portions 58 on the front side in the longitudinal direction of the vehicle body.

Figure 10:
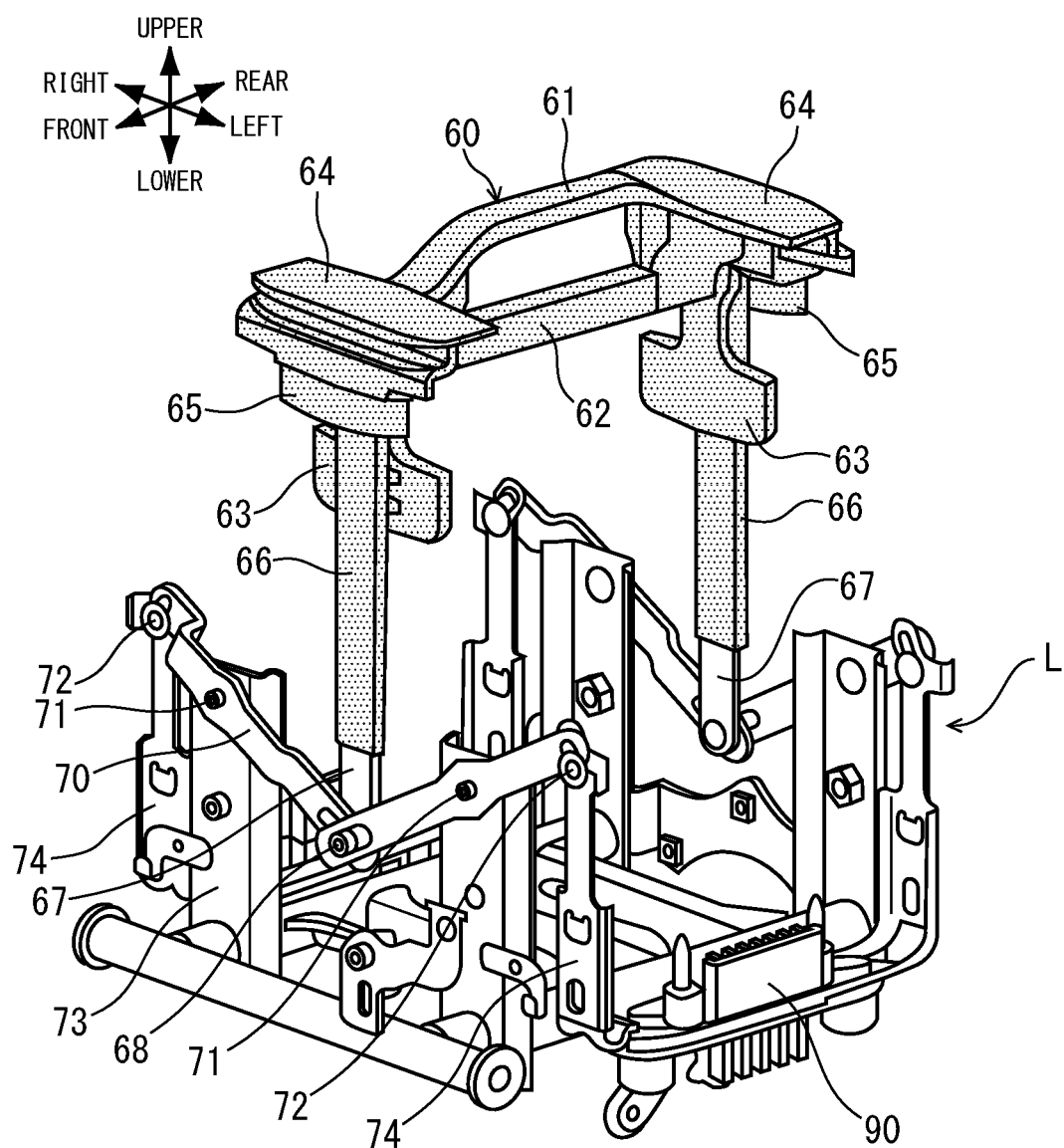
FIG. 10 is a perspective view illustrating the structure of the operation lever and a link mechanism.

FIG. 10 is a perspective view illustrating the structure of the operation lever 60 and the link mechanism L. Similar to the operation lever 60 having a substantially symmetrical shape in the longitudinal direction of the vehicle body and the vehicle width direction, the link mechanism L also has a substantially symmetrical shape in the longitudinal direction of the vehicle body and the vehicle width direction.

A pair of left and right arm members 70 is pivotally supported in a swingable manner by first swing shafts 71 at upper end portions of long substrates 73 supporting the link mechanism L. On one end sides of the arm members 70 which are positioned on the inner sides in the vehicle width direction, lower end portions 67 of the operation lever 60 are pivotally supported in a swingable manner by second swing shafts 68. The pivotally support portions of the second swing shafts 68 have an elongated hole shape for allowing slide of the leg portions 66 of the operation lever 60 in a substantially vertical direction. On the other end sides of the arm members 70 positioned on the outer sides in the vehicle width direction, terminal holders 74 for supporting case-side terminals 90 are pivotally supported in a swingable manner. The terminal holders 74 are formed in a substantially U-shape surrounding side surfaces of the batteries B facing in the longitudinal direction of the vehicle body.

According to the configuration described above, it is possible to obtain the link mechanism L having the configuration of "lever" including the fulcrum, the point of effort, and the point of load. More specifically, it is possible to obtain the link mechanism L, in which the first swing shafts 71 work as fulcrums, the second swing shafts 68 work as points of effort, and third swing shafts 72 work as points of load to cause the terminal holders 74 to be raised when the operation lever 60 is pushed down, and cause the terminal holders 74 to be lowered when the operation lever 60 is pulled up. In addition, since the two terminal holders 74 are connected to the link mechanism L, it is possible to obtain a structure causing the two terminal holders 74 to move vertically with the single operation lever 60. Further, the terminal holders 74 can be moved vertically with a small force using the principle of leverage. The arm members 70 and the substrates 73 can be made from a thin plate metal.

Figure 11:
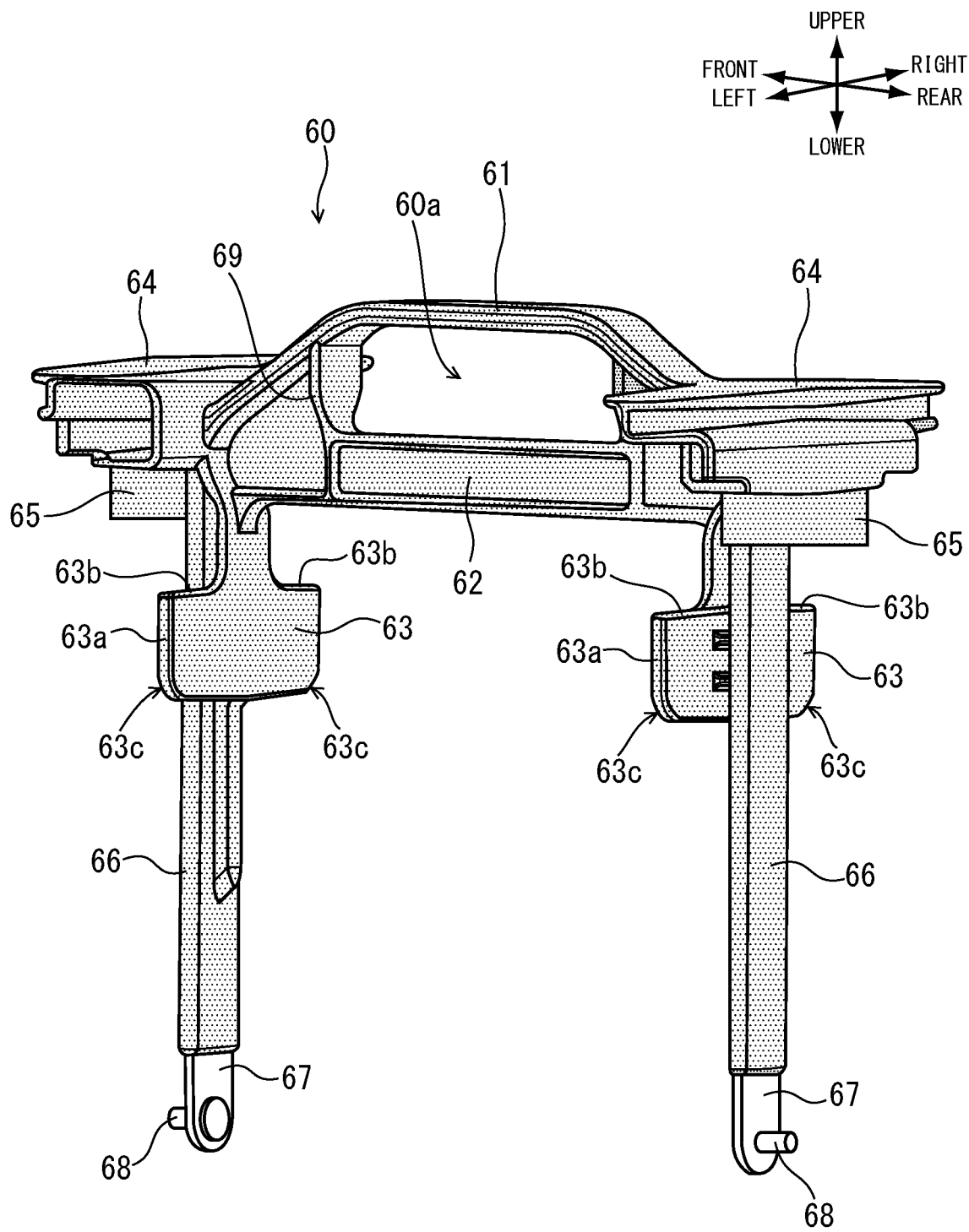
FIG. 11 is a perspective view of the operation lever.

FIG. 11 is a perspective view of the operation lever 60. In the operation lever 60 for operating the link mechanism L, the lower end portions 67 connected to one end portions of the arm members 70 are made from a thin plate metal, and the upper portion including the grip portion 61 and the partition portion 62 is made from a hard synthetic resin or the like to reduce the weight. The lower end portions 67 are insert-molded in the leg portions 66 deeply in the longitudinal direction to enhance the strength of the leg portions 66.

Between the grip portion 61 and the partition portion 62, a grip opening 60a, through which a rider puts his/her fingers, is formed. On the front and rear sides of the grip opening 60a in the longitudinal direction of the vehicle body, connecting portions 69 for connecting the grip portion 61 and the partition portion 62 are formed. The left and right side surfaces of the connecting portions 69 in the vehicle width direction have a tapered shape that is narrower toward the lower side.

The positioning plates 63 extending in the vehicle width direction between the leg portions 66 and the partition portion 62 each include side end surfaces 63a that come in contact with the tapered surfaces 51, which are tapered side surfaces of the positioning recesses 52, and upper end surfaces 63b that come in contact with the lower portions of the pressing holders 45 and push up the pressing holders 45 when the operation lever 60 is pulled upward. At corner portions on the lower sides of the positioning plates 63 having substantially a rectangular shape when viewed from the front, chamfered portions 63c are formed. On the lower portions of the pressing portions 64, stopper members 65 standing downward are formed.

The side end surfaces 63a of the positioning plates 63 inserted into the positioning recesses 52 have a tapered shape that is narrower toward the lower side. As a result, the positioning plates 63 are placed in the positioning recesses 52 having the tapered surfaces 51 functioning as guides, enabling the operation lever 60 to be smoothly held at the neutral position by simply pushing down the operation lever 60. In addition, since the chamfered portions 63c are formed at the corner portions on the lower sides of the positioning plates 63, when the operation lever 60 is being pushed down, the chamfered portions 63c come into contact with the tapered surfaces 51 of the positioning recesses 52 so that the operation of pushing down the operation lever 60 can be performed more smoothly.

Figure 12:
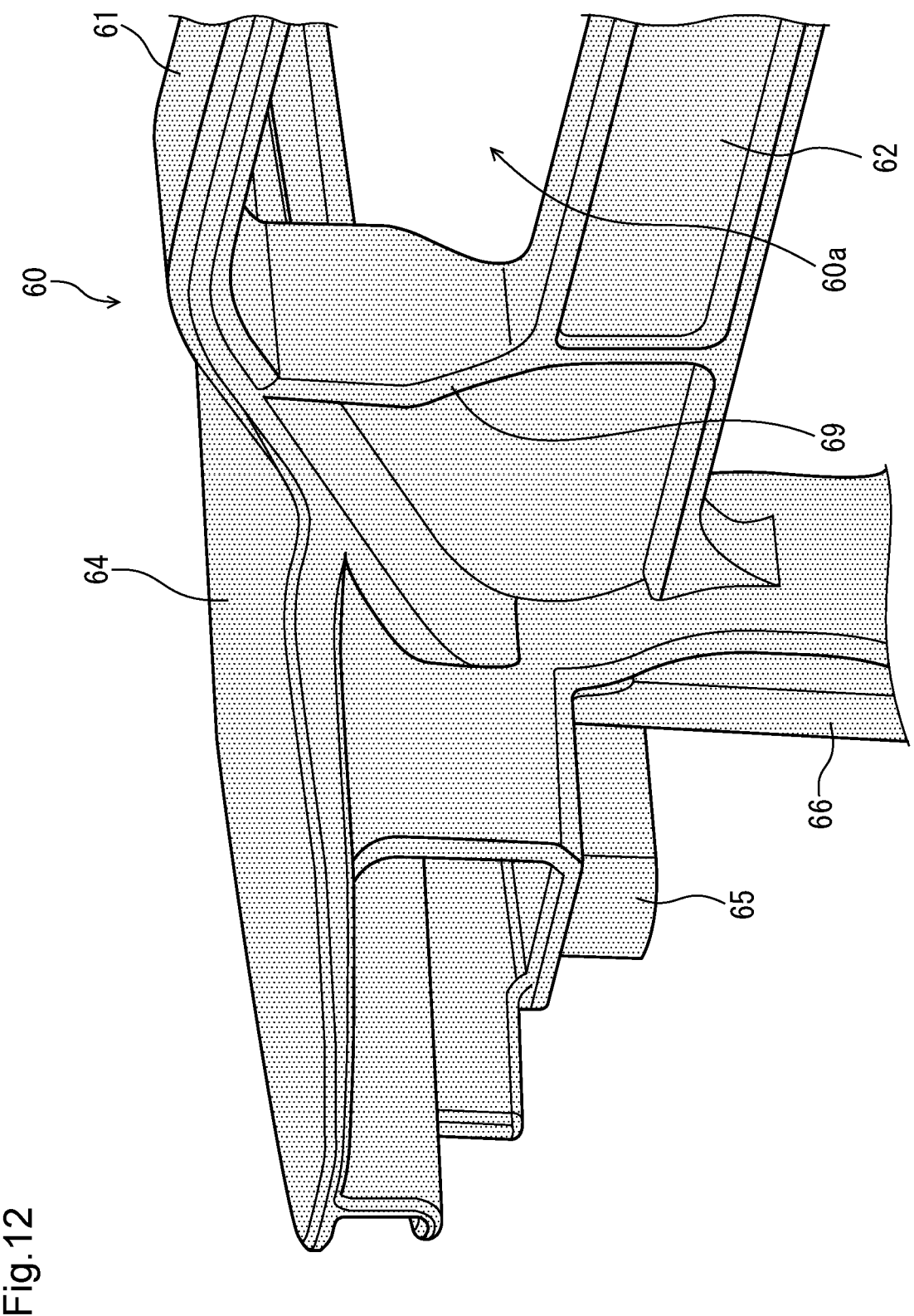
FIG. 12 is a partially enlarged view of FIG. 11.
Figure 13:
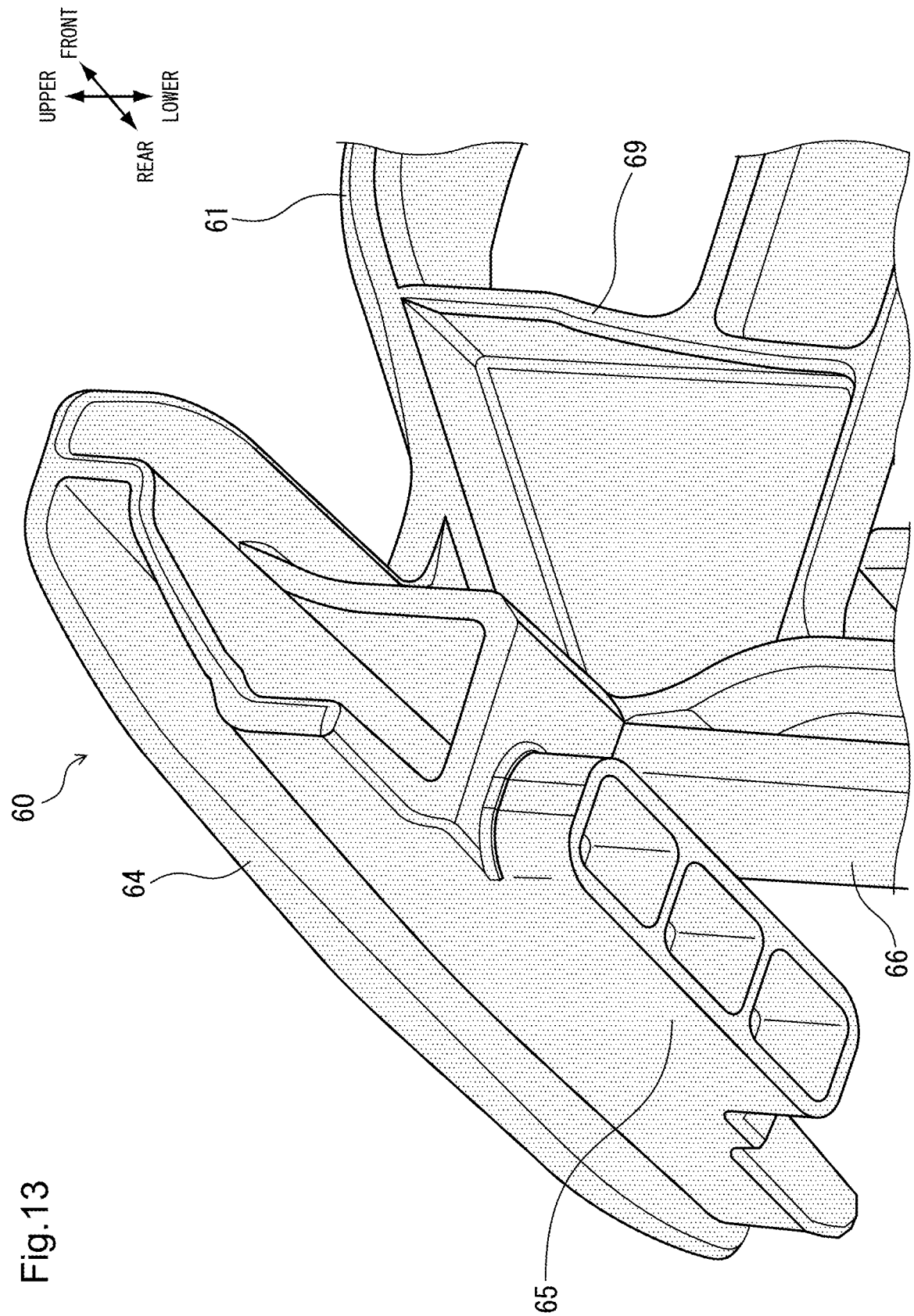
FIG. 13 is an enlarged perspective view illustrating a configuration around a stopper member.

FIG. 12 is a partially enlarged view of FIG. 11. FIG. 13 is an enlarged perspective view illustrating a configuration around the stopper members 65. As described above, both side surfaces of the connecting portions 69 in the vehicle width direction have a tapered shape that is narrower toward the lower side. Thus, even if the upper end portions of the batteries B bump against the operation lever 60 when the batteries B are pulled out upward from the battery case 40, the operation lever 60 is smoothly retracted due to the tapered shape of the connecting portions 69, making it easy to pull out the batteries B. The stopper members 65 provided at the lower portions of the pressing portions 64 are in contact with a ceiling surface of the upper case 41 positioned between the pressing holders 45 on the left and right sides in the vehicle width direction to define the lowermost position of the operation lever 60. The stopper members 65 each are formed to have a substantially rectangular parallelepiped shape that has three hollow recesses and extends in the vehicle width direction.

Figure 14:
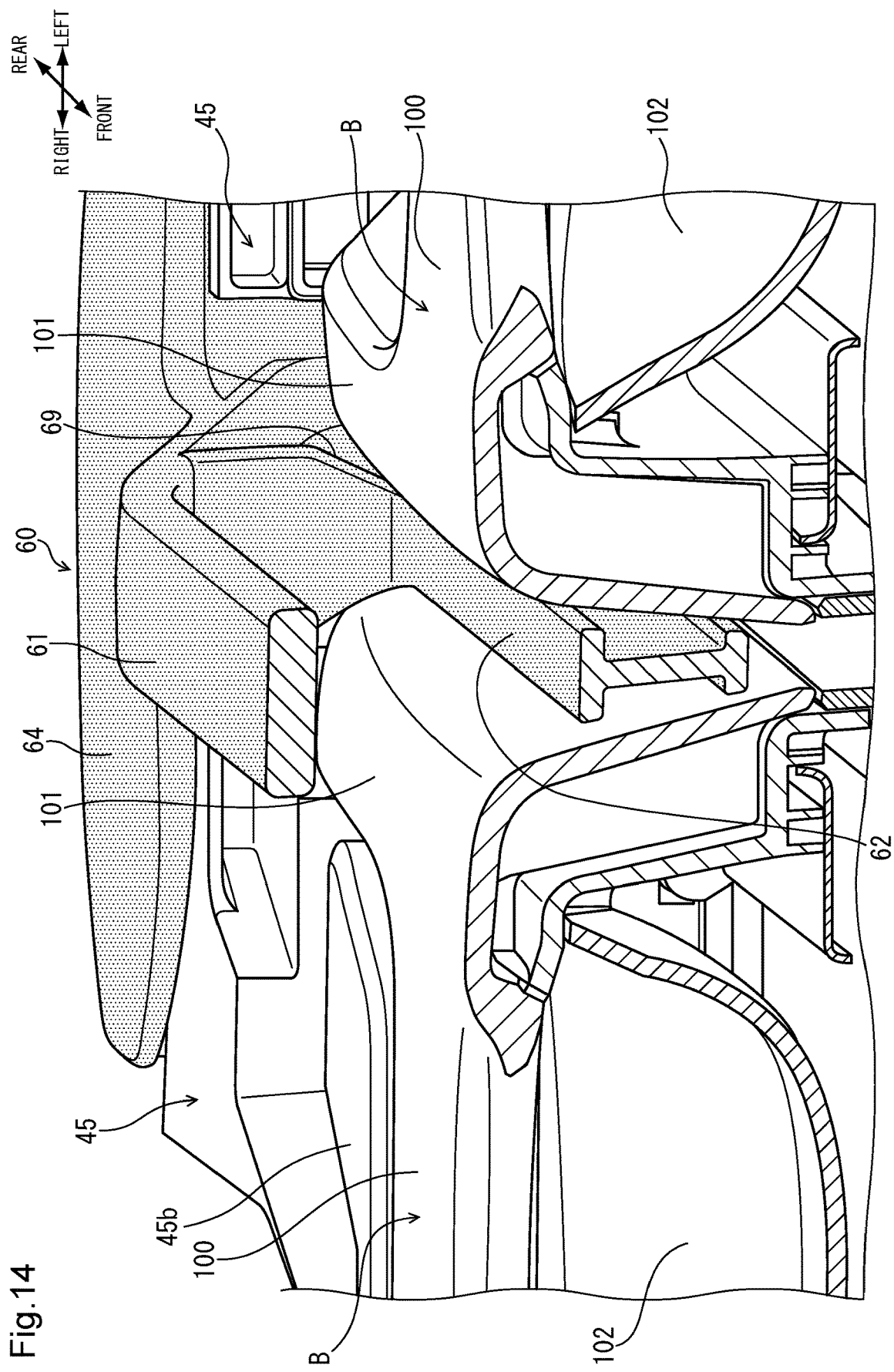
FIG. 14 is a perspective view illustrating a cross section taken along line XIV-XIV of FIG. 4.

FIG. 14 is a perspective view illustrating a cross section taken along line XIV-XIV of FIG. 4. The two batteries B are arranged side by side in the vehicle width direction. The operation lever 60 includes the grip portion 61 projecting upward from the upper surfaces 102 of the batteries B in a state where the batteries B are stored in the battery case 40, and the partition portion 62 inserted between the batteries B in the state where the batteries B are stored in the battery case 40. The partition portion 62 is formed narrower than the grip portion 61, and the grip opening 60a through which a rider puts his/her fingers is formed between the grip portion 61 and the partition portion 62. Thus, the partition portion 62 prevents the batteries B from interfering with each other to protect the batteries B from an impact, and the heat radiation effect of the batteries B can be enhanced. Further, by putting fingers through the grip opening 60a, the wide grip portion 61 can be easily gripped, and the operation of attaching and detaching the batteries B can be facilitated. The partition portion 62 may be further extended downward to enhance the insulation function between the batteries B.

Figure 15:
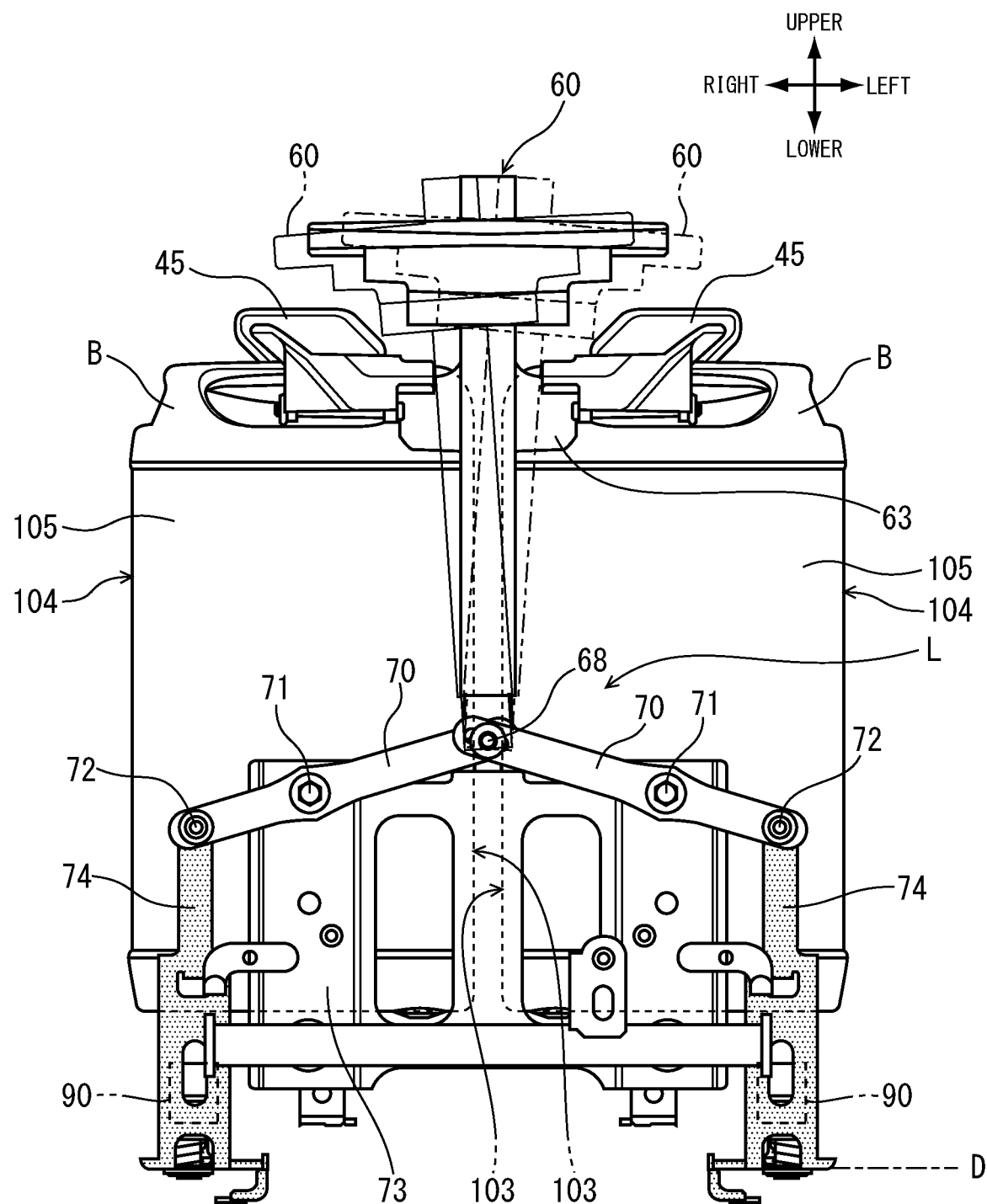
FIG. 15 is a front view illustrating the structure of the link mechanism (a state where the operation lever is pulled up).
Figure 16:
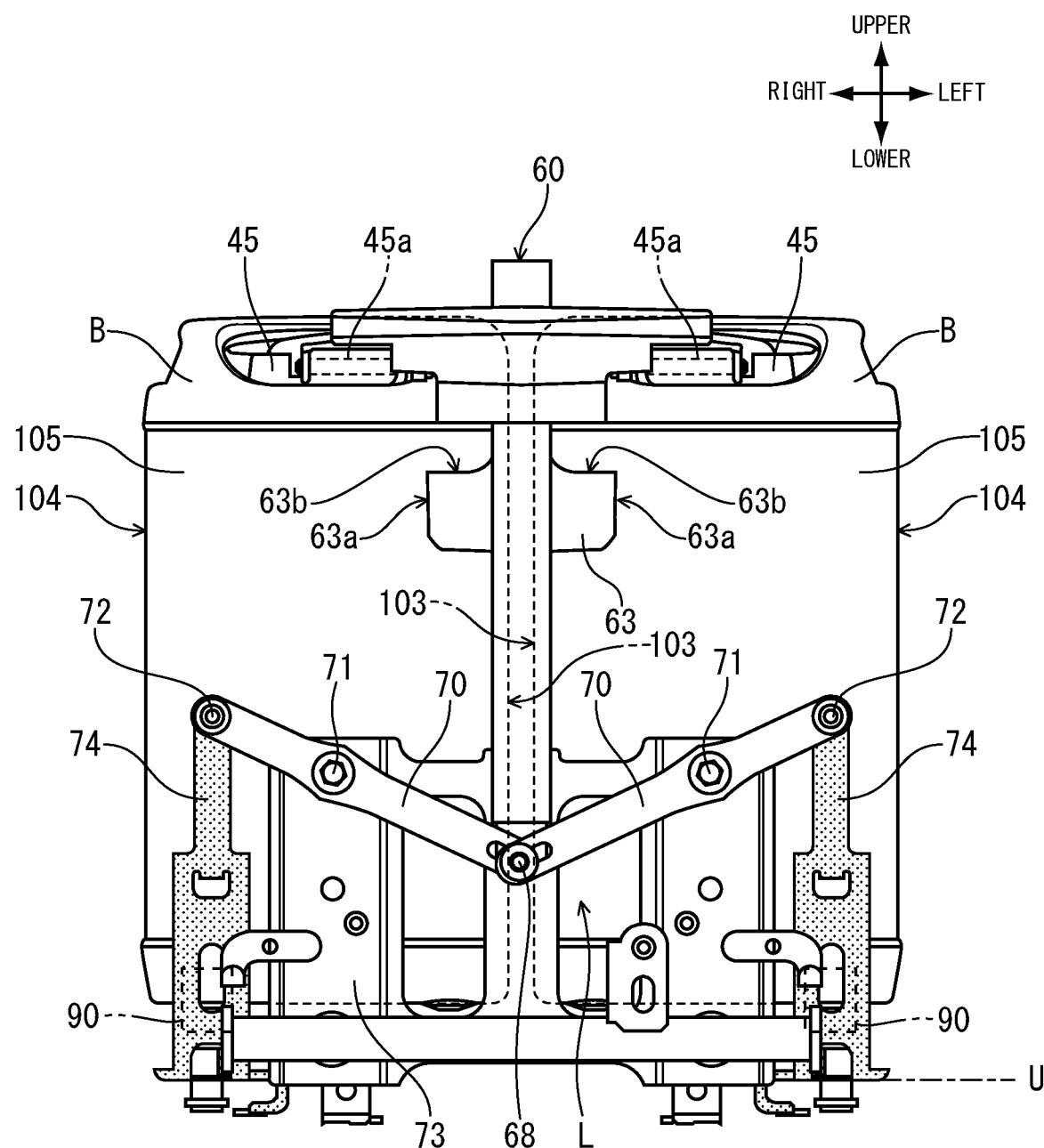
FIG. 16 is a front view illustrating the structure of the link mechanism (a state where the operation lever is pushed down to a predetermined lowermost position).

FIGS. 15 and 16 are front views illustrating the structure of the link mechanism L. FIG. 15 illustrates a state where the operation lever 60 is pulled up, and FIG. 16 illustrates a state where the operation lever 60 is pushed down to a predetermined lowermost position. The pressing holders 45 pivotally supported in a swingable manner by the battery case 40 are urged by an elastic member in a direction to press the upper surfaces of the batteries B. Here, when the operation lever 60 is pulled upward, the upper end surface 63b of the positioning plate 63 comes into contact with the lower surfaces of the pressing holders 45, and when the operation lever 60 is pulled upward further against the urging force of the elastic member, the pressing holders 45 are swung upward to stand. At the same time, when the operation lever 60 is pulled upward, the terminal holders 74 connected to the link mechanism L are lowered to a retracted position D, and the case-side terminals 90 are separated from the batteries B.

On the other hand, when the operation lever 60 is pushed downward, the pressing holders 45 are swung in the direction of pressing the upper surfaces 102 of the batteries B by the urging force of the elastic member. At the same time, by pushing the operation lever 60 downward, the terminal holders 74 connected to the link mechanism L are raised to a connected position U, so that the case-side terminals 90 are connected to the battery-side terminals (see FIG. 27) provided at the bottom of the batteries B.

That is, by pushing the single operation lever 60 downward, the upper surfaces 102 of the two batteries B are pressed by the pressing holders 45, and the case-side terminals 90 are engaged with the battery-side terminals provided on the lower surfaces of the batteries B, so that the batteries B can be held in a manner being sandwiched from the upper and lower sides. As a result, the batteries B can be stably held, and good electrical connection can be maintained even when, for example, the vehicle rides over a large level difference. Further, when the grip portion 61 positioned above the batteries B is gripped and the operation lever 60 is pushed down, the two batteries B are held at the same time, and when the operation lever 60 is pulled up, the batteries B can be in a detachable state, so that the convenience of the attaching and detaching operation of the batteries B is enhanced.

The operation lever 60 is configured to be swingable about the second swing shafts 68 in a state where the operation lever 60 is pulled upward to move the terminal holders 74 to the retracted position D. As a result, even when the operation lever is disposed between two batteries arranged close to each other, interference between the batteries B can be prevented by the operation lever 60 being swung when the batteries B are pulled out upward. Therefore, it is possible to reduce the size of the battery case 40 by arranging the two batteries B as close as possible to each other to reduce the space required for storing the batteries B.

In addition, in the present embodiment, two batteries B are arranged side by side in the vehicle width direction, and the first swing shafts 71, the second swing shafts 68, and the third swing shafts 72 are disposed at positions where they overlap with the batteries B in the front view of the vehicle body. Thus, by disposing the link mechanism L at a position where it overlaps with the batteries B when viewed from the front of the vehicle body, it is possible to reduce the size of the battery case 40 and the vehicle body.

Figure 17:
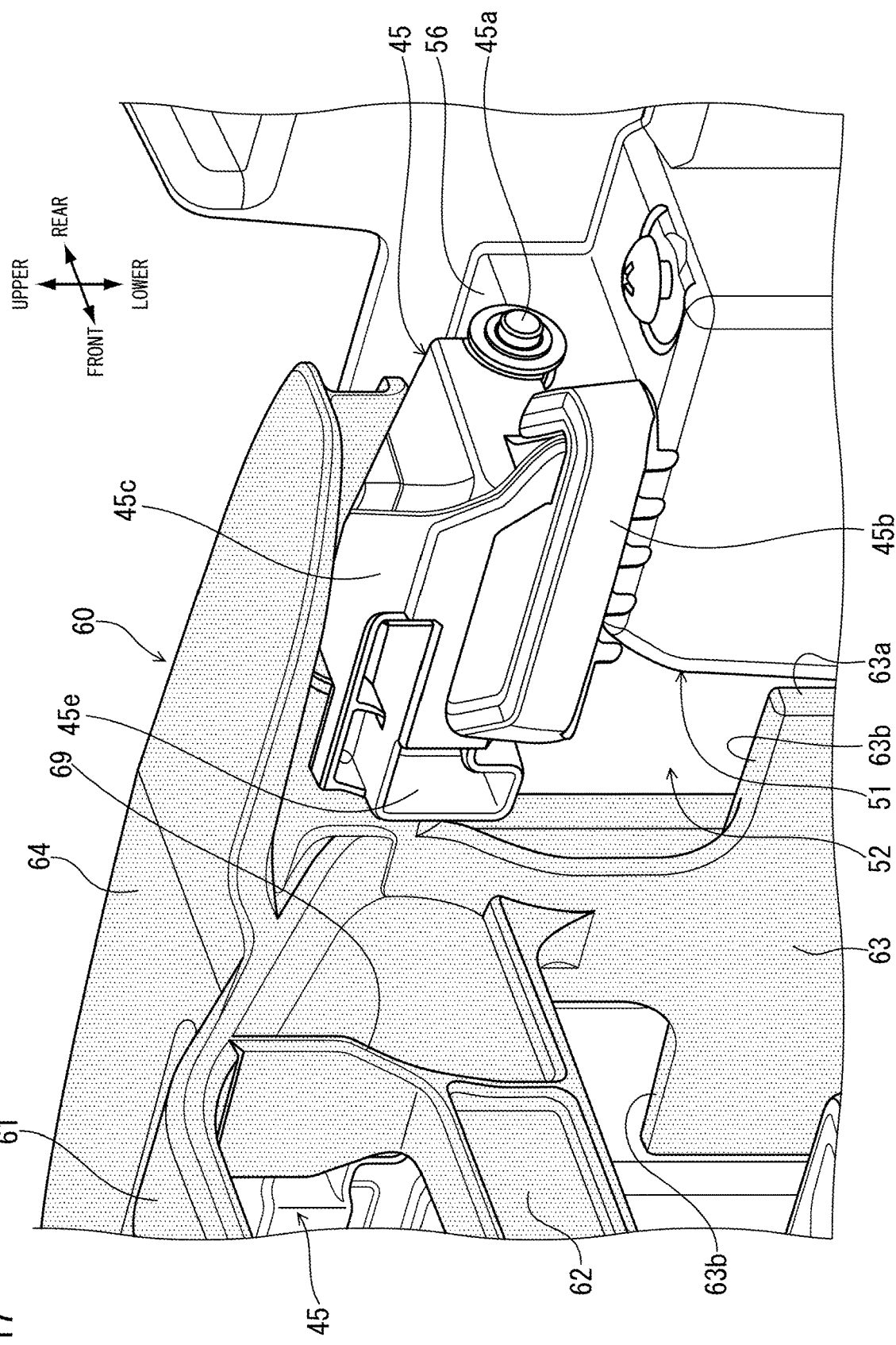
FIG. 17 is a perspective view illustrating a pressing holder in a state where the operation lever is pushed down to the predetermined lowermost position.
Figure 18:
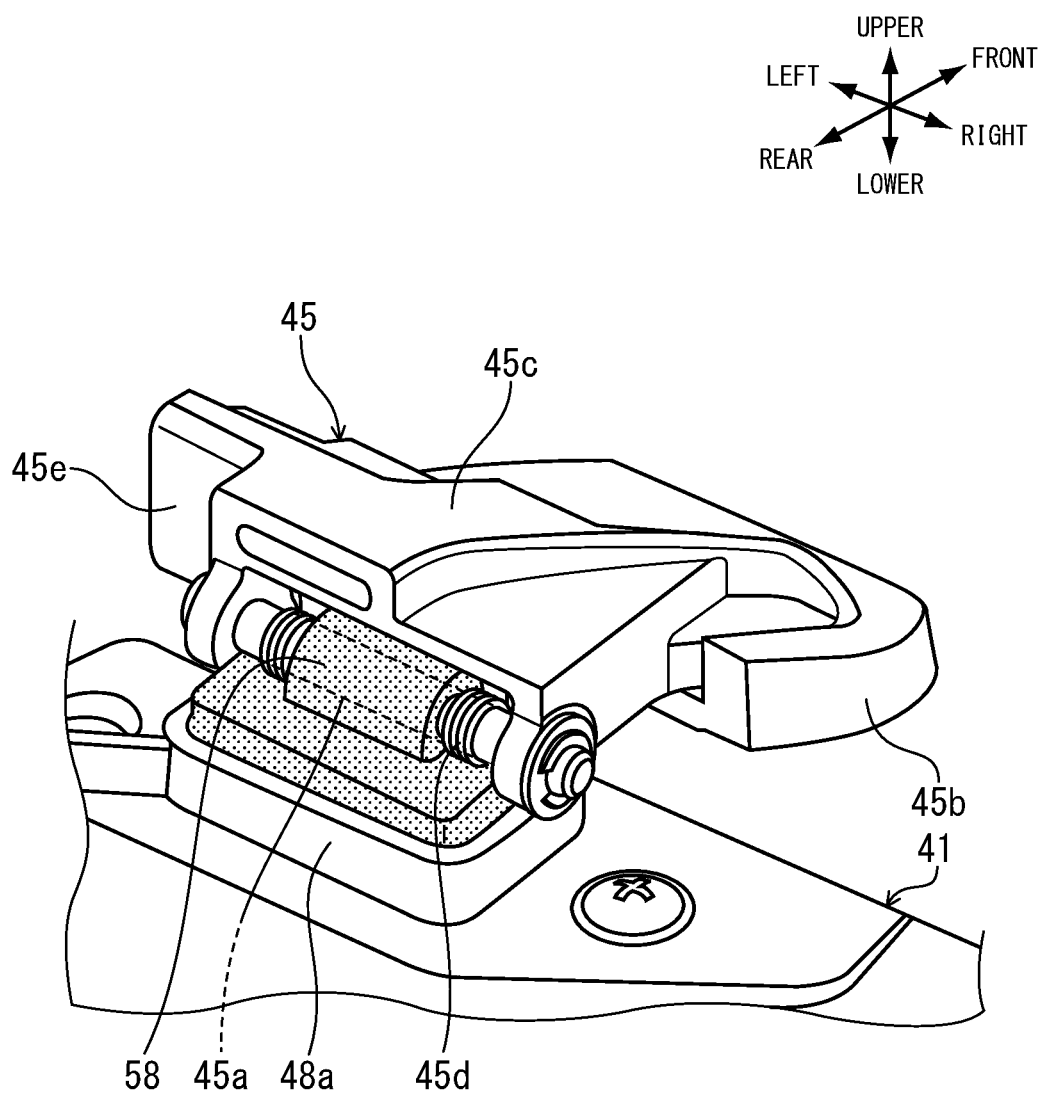
FIG. 18 is a perspective view of the pressing holder, which is on the rear side of the vehicle body, viewed from the rear side of the vehicle body (a state where the upper surface of the battery is pressed).
Figure 19:
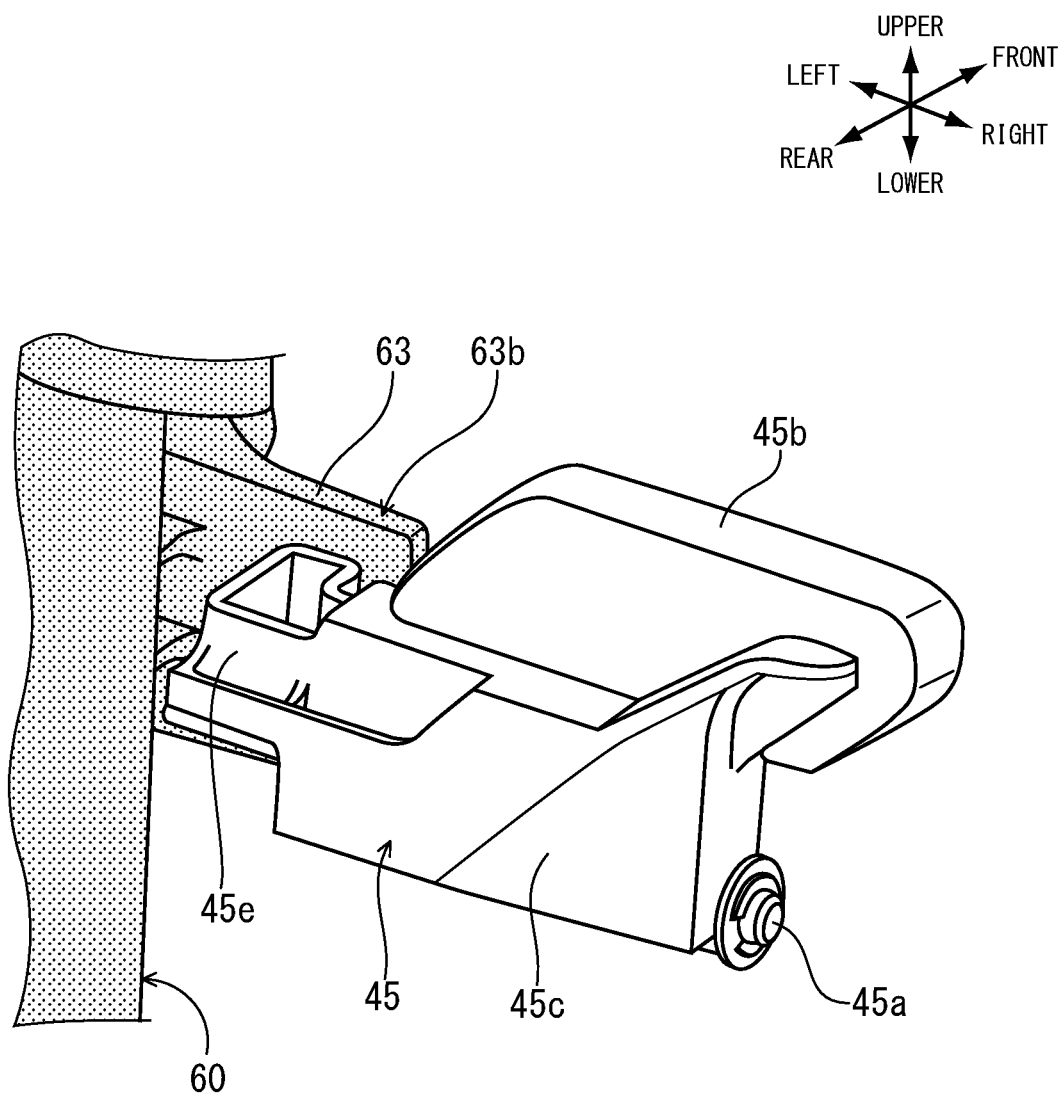
FIG. 19 is a perspective view of the pressing holder, which is on the rear side of vehicle body, viewed from the rear side of the vehicle body (a state where the pressing holder stands upward along with the pulling up operation of the operation lever).

FIG. 17 is a perspective view illustrating one of the pressing holders 45 in a state where the operation lever 60 is pushed down to the predetermined lowermost position. FIGS. 18 and 19 are perspective views of the pressing holder 45 on the rear side of the vehicle body, viewed from the rear side of the vehicle body. FIG. 18 illustrates a state where the pressing holder 45 presses the upper surface 102 of the battery B, and FIG. 19 illustrates a state where the pressing holder 45 stands upward along with the pulling up operation of the operation lever 60.

The pressing holder 45 includes a main body portion 45c pivotally supported in a swingable manner by a swing shaft 45a, an elastic member 45d urging the main body portion 45c in a direction of pressing the upper surface 102 of the battery B, and a pressing portion 45b that is fixed to the main body portion 45c and is in contact with the upper surface 102 of the battery B. The main body portion 45c is made from a metal such as aluminum or a hard synthetic resin, and the pressing portion 45b can be made from a resin such as rubber. Inside the main body portion 45c in the vehicle width direction, an interference portion 45e having a bottomed box shape is provided, and to the interference portion 45e, the upper end surface 63b of the positioning plate 63 comes into contact from a lower position. The elastic member 45d is a coil spring wound around the swing shaft 45a, and can apply an urging force in one direction to the swing motion of the pressing holder 45 with a simple structure.

Figure 20:
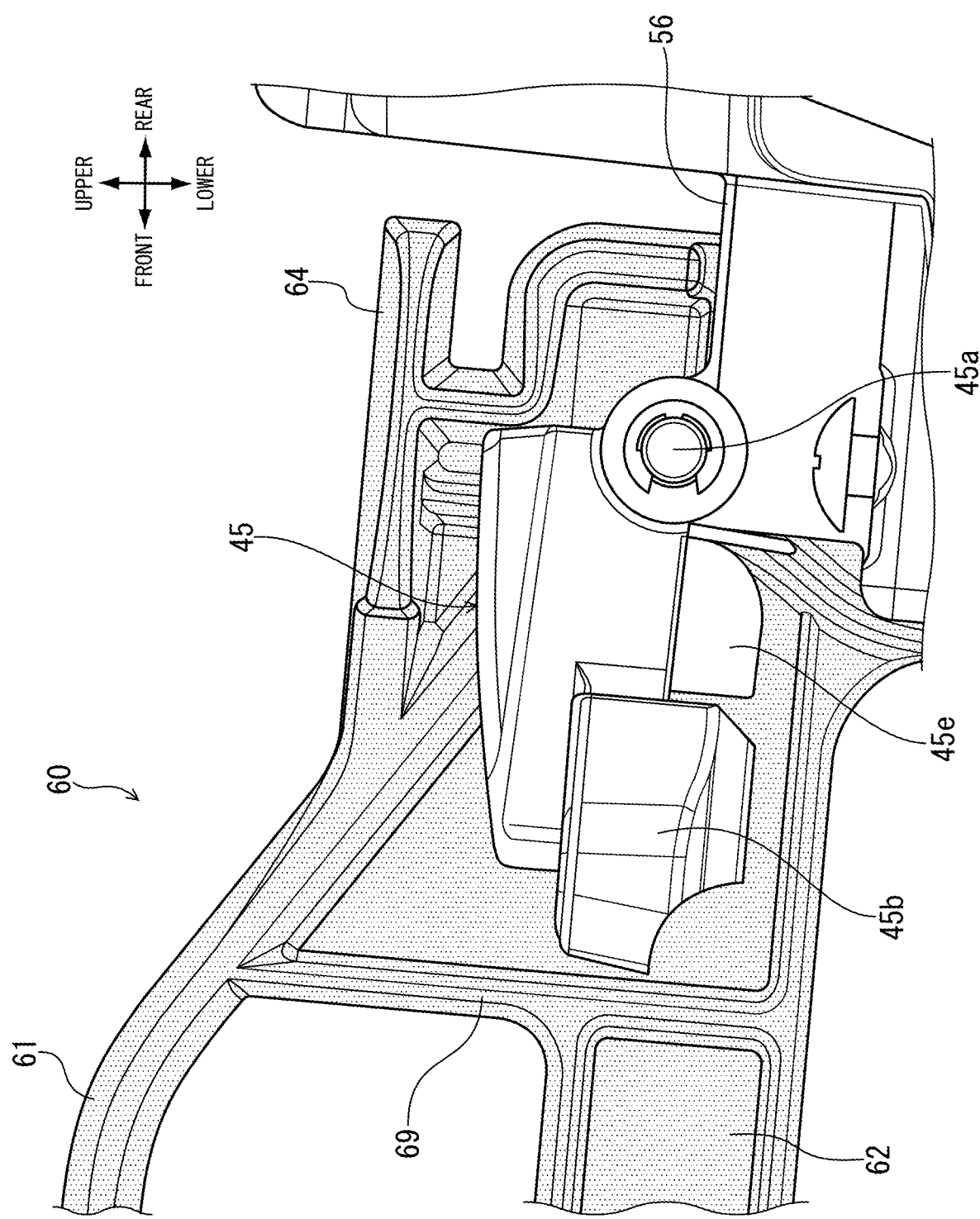
FIG. 20 is a left side view illustrating the pressing holder in a state where the operation lever is pushed down to the predetermined lowermost position.

FIG. 20 is a left side view illustrating the pressing holder 45 in a state where the operation lever 60 is pushed down to the predetermined lowermost position. The interference portion 45e has a shape such that the interference portion 45e projects downward from the pressing holder 45 at a frontward (rearward) position of the swing shaft 45a in the longitudinal direction of the vehicle body in the state where the operation lever 60 is pushed down. The pressing portion 45b is disposed outside the interference portion 45e in the vehicle width direction and in front of the interference portion 45e in the longitudinal direction of the vehicle body.

Figure 21:
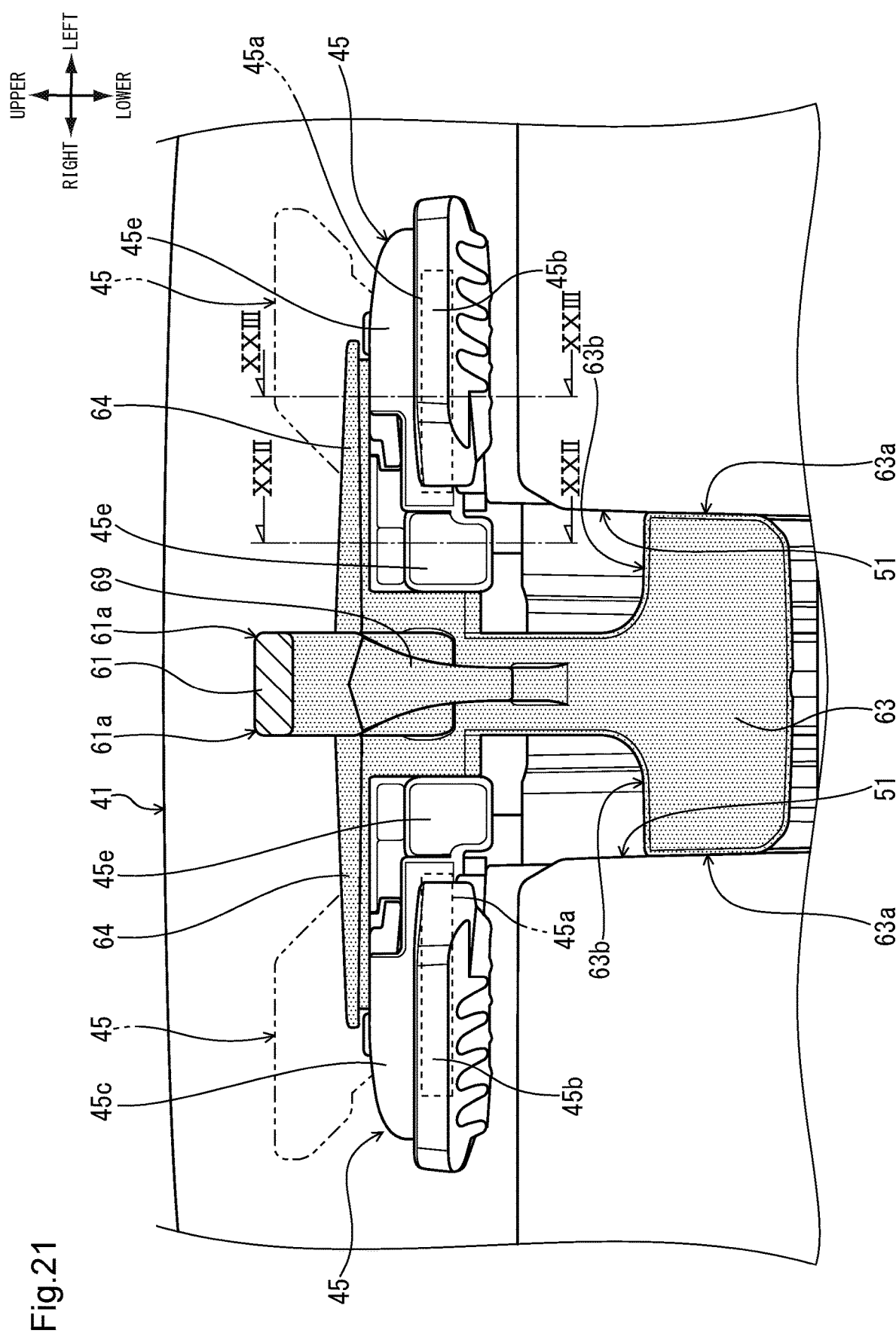
FIG. 21 is a cross-sectional view taken along line XXI-XXI of FIG. 4.

FIG. 21 is a cross-sectional view taken along line XXI-XXI of FIG. 4. In this figure, the batteries B are not illustrated for the sake of description. The swing shaft 45a of the pressing holder 45 is provided to extend in the vehicle width direction while the operation lever 60 slides in the vertical direction. Thus, the pressing holder 45 can be easily swung in association with the sliding motion of the operation lever 60. Further, since the two corner portions 61a on the upper end side of the grip portion 61 are formed as curved planes, when the batteries B are inserted into the battery case 40, the batteries B can be protected even if the side surfaces of the batteries B come into contact with the operation lever 60.

Figure 22:
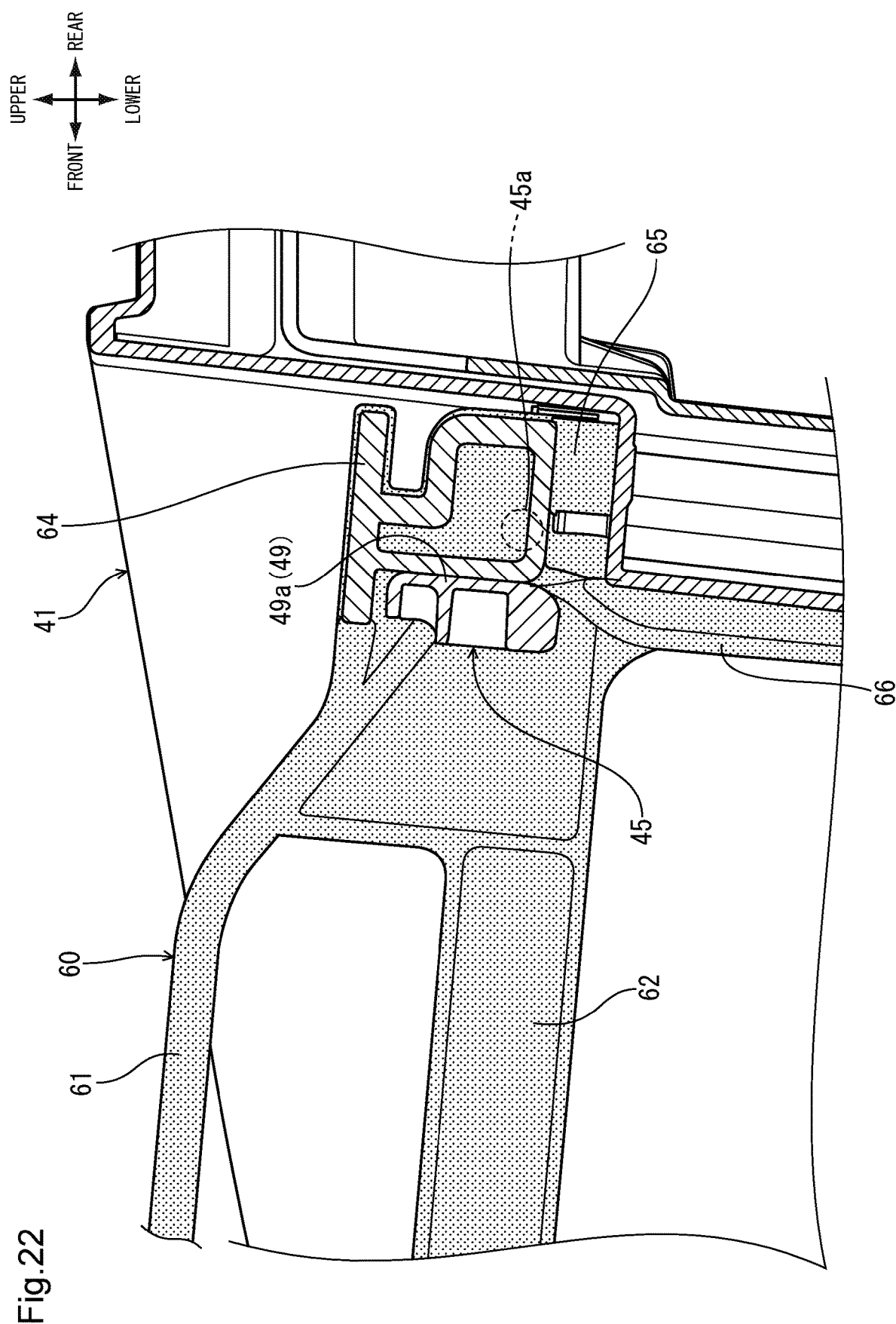
FIG. 22 is a cross-sectional view taken along line XXII-XXII of FIG. 21.
Figure 23:
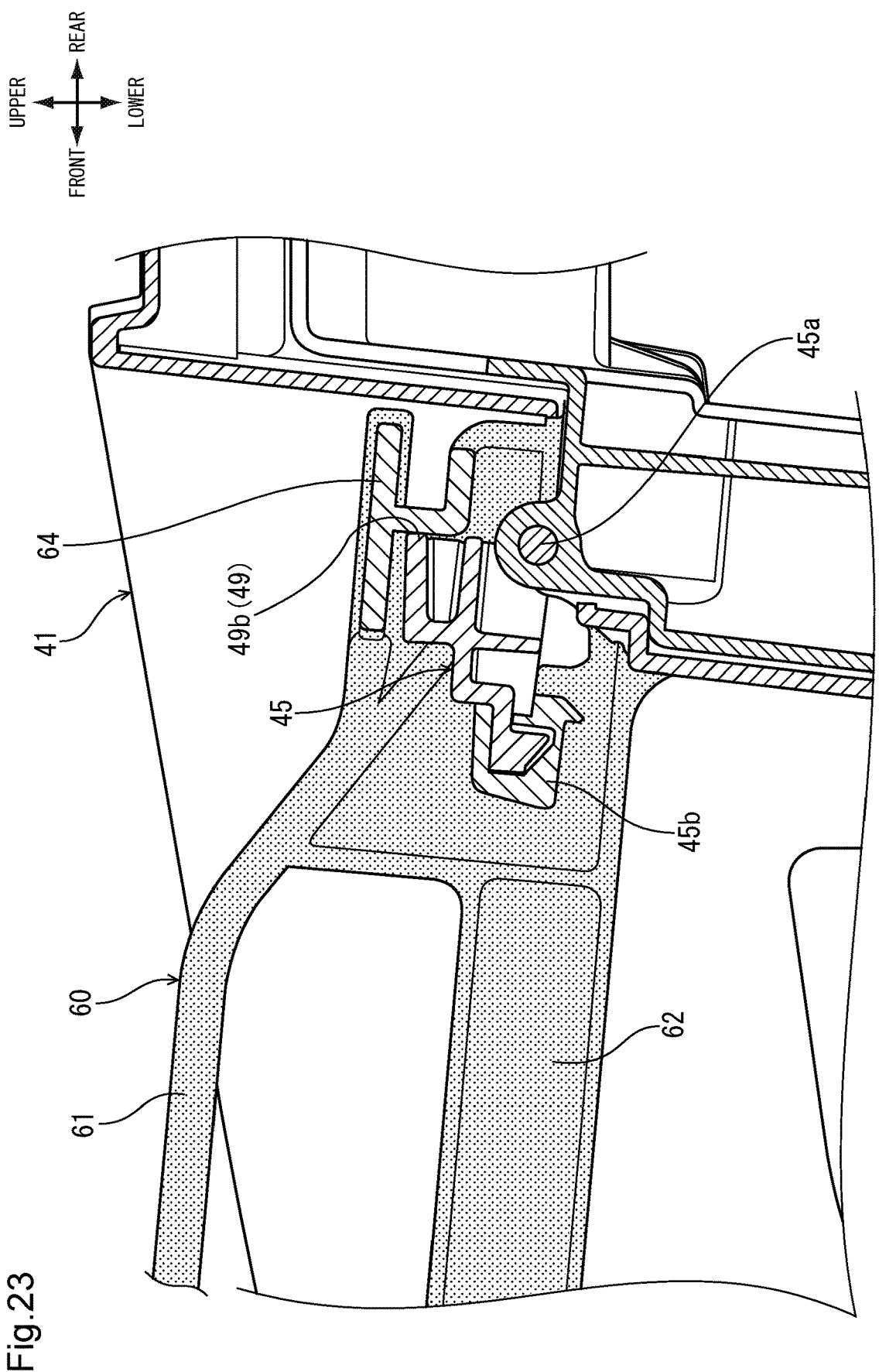
FIG. 23 is a cross-sectional view taken along line XXIII-XXIII of FIG. 21.

FIG. 22 is a cross-sectional view taken along line XXII-XXII of FIG. 21. FIG. 23 is a cross-sectional view taken along line XXIII-XXIII of FIG. 21. The pressing holder 45 is provided with a contact portion 49 that comes into contact with the operation lever 60 when the operation lever 60 is pushed down. The contact portion 49 includes a first contact portion 49a (see FIG. 22) which is not located at a position radially outer than the swing shaft 45a, and a second contact portion 49b (see FIG. 23) which is located radially outer than and close to the swing shaft 45a.

The area of a portion where the first contact portion 49a provided at a position near to the center in the vehicle width direction and the operation lever 60 are in contact with each other is set to be larger than the area of a portion where the second contact portion 49b provided at a position near to the outer side in the vehicle width direction and the operation lever 60 are in contact with each other. By thus increasing the contact area with the operation lever 60 in a region that does not overlap with the swing shaft 45a of the pressing holder 45 in the axial direction, the holding force of the pressing holder 45 can be increased.

According to the structure of the contact portion 49 described above, it is possible to obtain a configuration in which the pressing holders 45 press the upper surfaces 102 of the batteries B and the operation lever 60 comes into contact with the pressing holders 45 by storing the batteries B in the battery case 40 and pressing down the operation lever 60. That is, the swing motion of the pressing holders 45 is limited by the operation lever 60, so that the batteries B are prevented from moving upward of the vehicle body even when, for example, the vehicle rides over a large level difference, thereby maintaining a good electrical connection.

Figure 24:
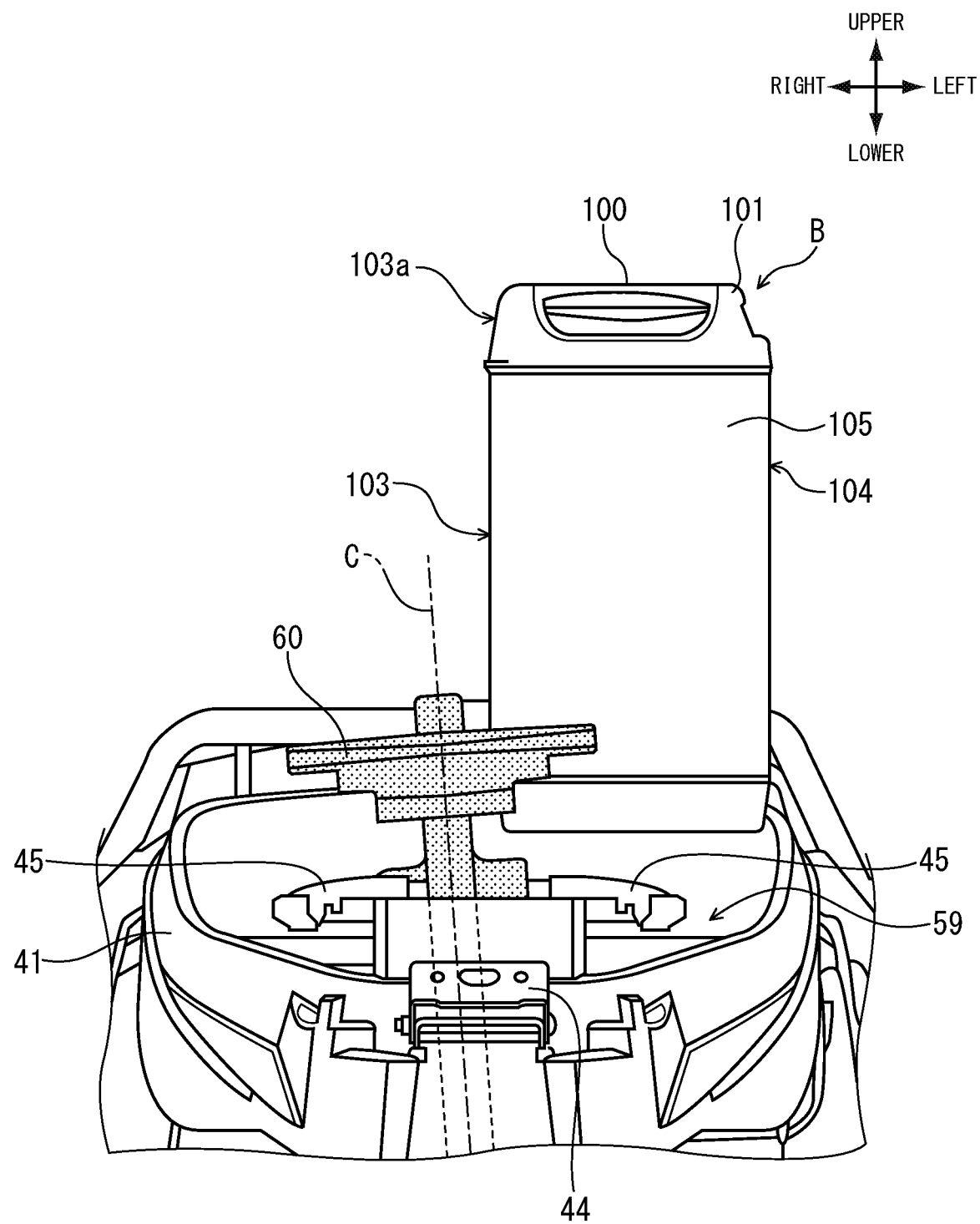
FIG. 24 is a front view illustrating the relationship between a battery and the operation lever during storage of the battery.

FIG. 24 is a front view illustrating the relationship between one of the batteries B and the operation lever 60 during storage of the battery B. The battery B has a substantially rectangular parallelepiped shape elongated in the vertical direction of the vehicle body. The operation lever 60 is configured such that when the battery B is pulled upward from a state where the terminal holder 74 is in the retracted position D, the operation lever 60 is pushed away by an inclined side surface 103a provided at a position near to an upper portion of the battery B, and thus is swung in a direction away from the battery B. That is, when the battery B is pulled upward, the operation lever 60 automatically swings to a state where the battery B can be detached, facilitating the operation of detaching the battery B. The inclination of the center line C of the operation lever 60 is set such that even when the battery B on a side toward which the operation lever 60 is inclined is pulled out, the inclined side surface 103a moves along the shape of the connecting portion 69 of the operation lever 60 and the operation lever 60 can automatically swing to the opposite side. The upper corner portions of the grip portion 61 of the operation lever 60 function as guide members for placing the batteries into predetermined positions by making the inner side surfaces, in the vehicle width direction, of the batteries B come into contact with the upper corner portions when the batteries B are inserted.

Figure 25:
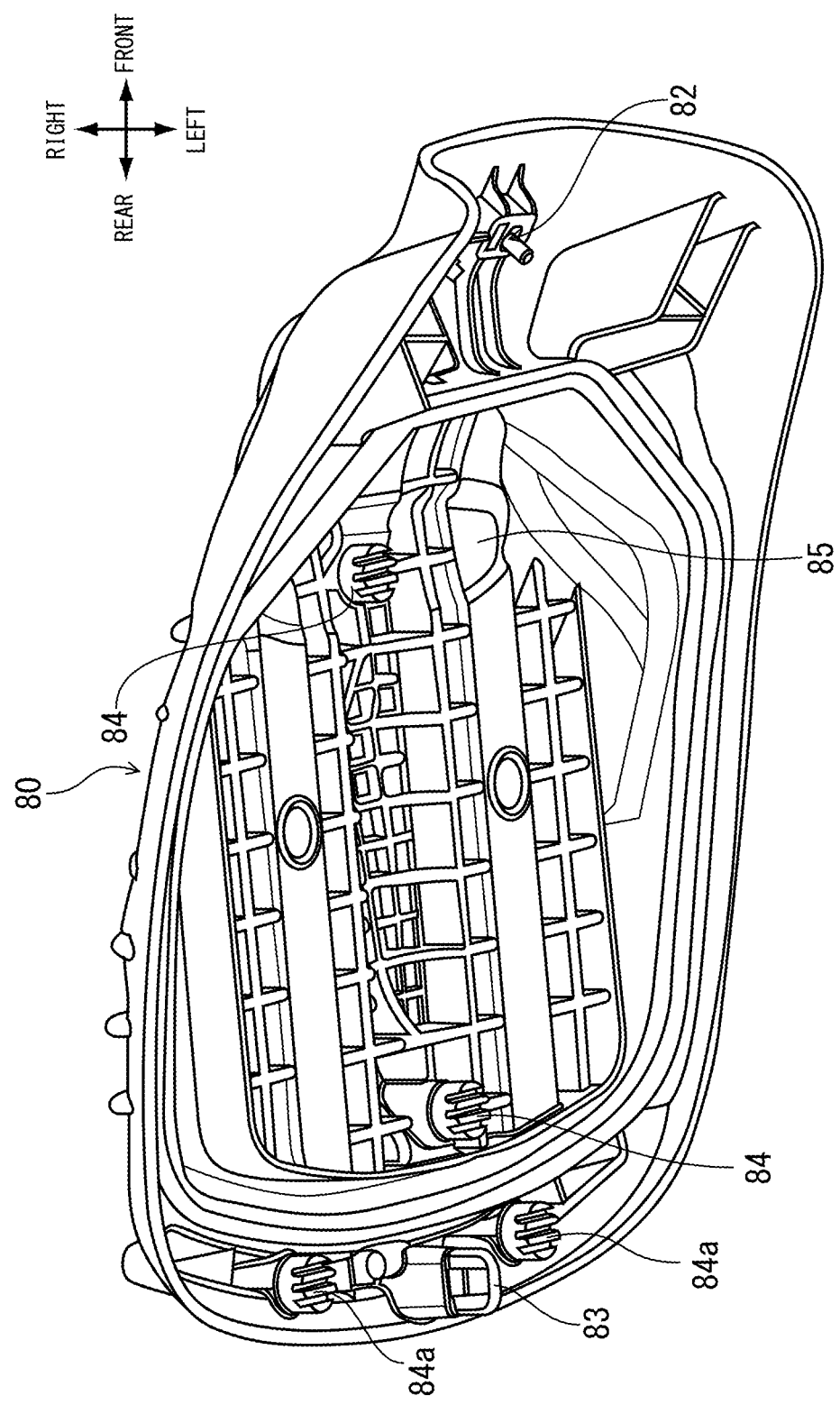
FIG. 25 is a perspective view of a seat bottom plate as viewed from the lower side of the vehicle body.
Figure 26:
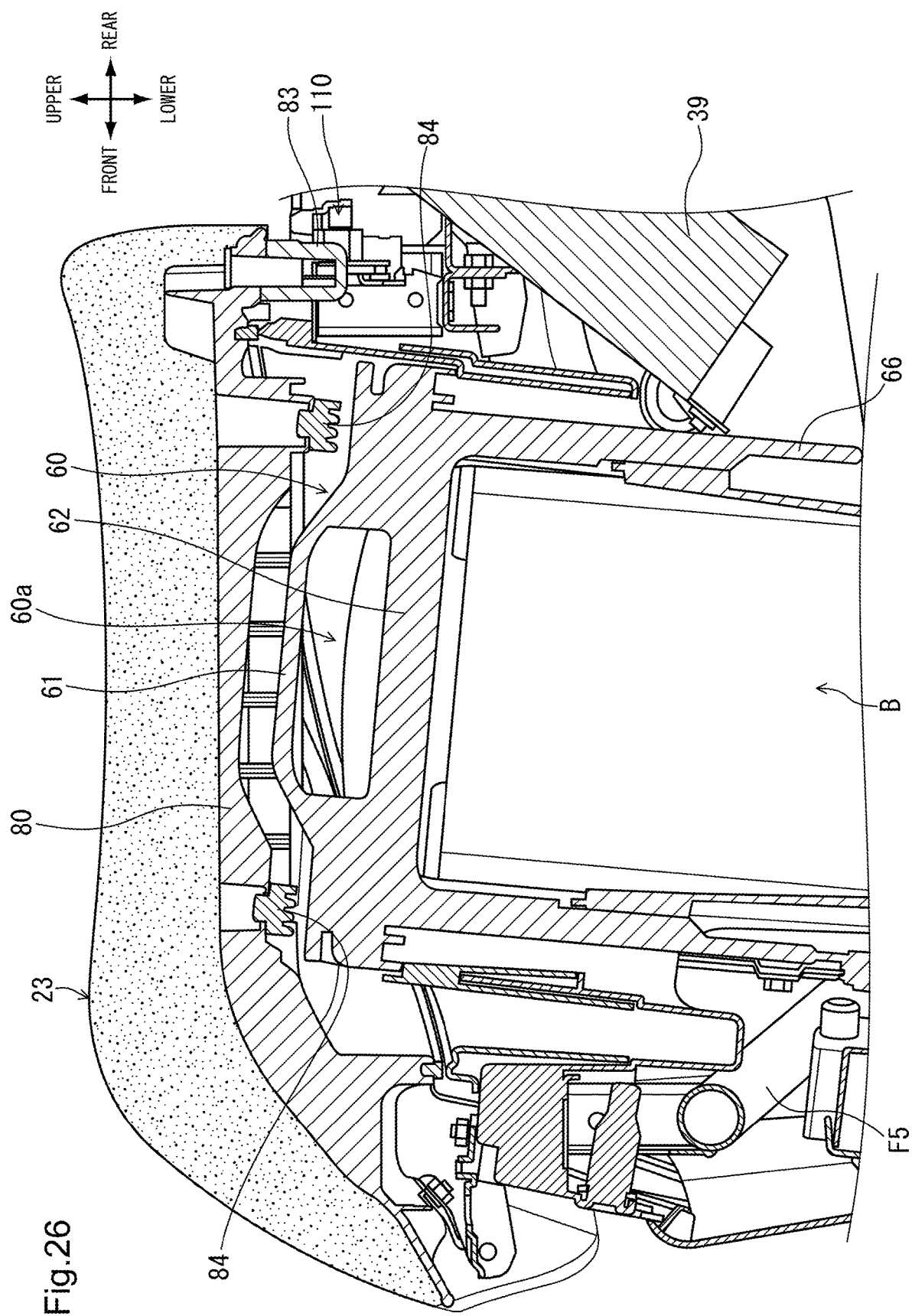
FIG. 26 is a cross-sectional view taken along line XXVI-XXVI of FIG. 4.

FIG. 25 is a perspective view of a seat bottom plate 80 forming the bottom portion of the seat 23 as viewed from a lower position of the vehicle body. FIG. 26 is a cross-sectional view taken along line XXVI-XXVI of FIG. 4. In FIG. 26, the seat 23 and the seat bottom plate 80 are also illustrated. At a front end portion of the seat bottom plate 80, a fixing member 82 for fixing the seat 23 to the hinge mechanism 44 is provided, while at a rear end portion of the seat bottom plate 80, a pair of left and right vibration-proof rubber portions 84a for absorbing impact and vibrations when the seat 23 is closed and a hook 83 for engaging with a seat catch mechanism 110 are provided. At the front and rear of the center of the seat bottom plate 80 in the vehicle width direction, bosses 84 that come into contact with the upper surface of the operation lever 60 are provided. The bosses 84 can be formed from a hard synthetic resin or the like. A recess 85 is formed around the boss 84 on the front side in the longitudinal direction of the vehicle body to avoid interference with the pressing portion 64 of the operation lever 60.

The bosses 84 are configured to have a function of pushing down the operation lever 60 when the seat 23 is closed in a state where the operation lever 60 is above a predetermined lowermost position, but not to be in contact with the operation lever 60 in a state where the operation lever 60 is pushed down to the predetermined lowermost position. Thus, the bosses 84 are configured such that when the seat 23 is closed, if the operation lever 60 is not pushed down sufficiently, the bosses 84 come into contact with the operation lever 60 to push the operation lever 60 down at least to a position where the battery-side terminals 75 and the case-side terminals 90 are electrically connected, and if the operation lever 60 is pushed down to the predetermined lowest position, the bosses 84 are not in contact with the operation lever 60, whereby the operation lever 60 sufficiently pushed down to the predetermined lowermost position can be prevented from being further applied with a load.

Figure 27:
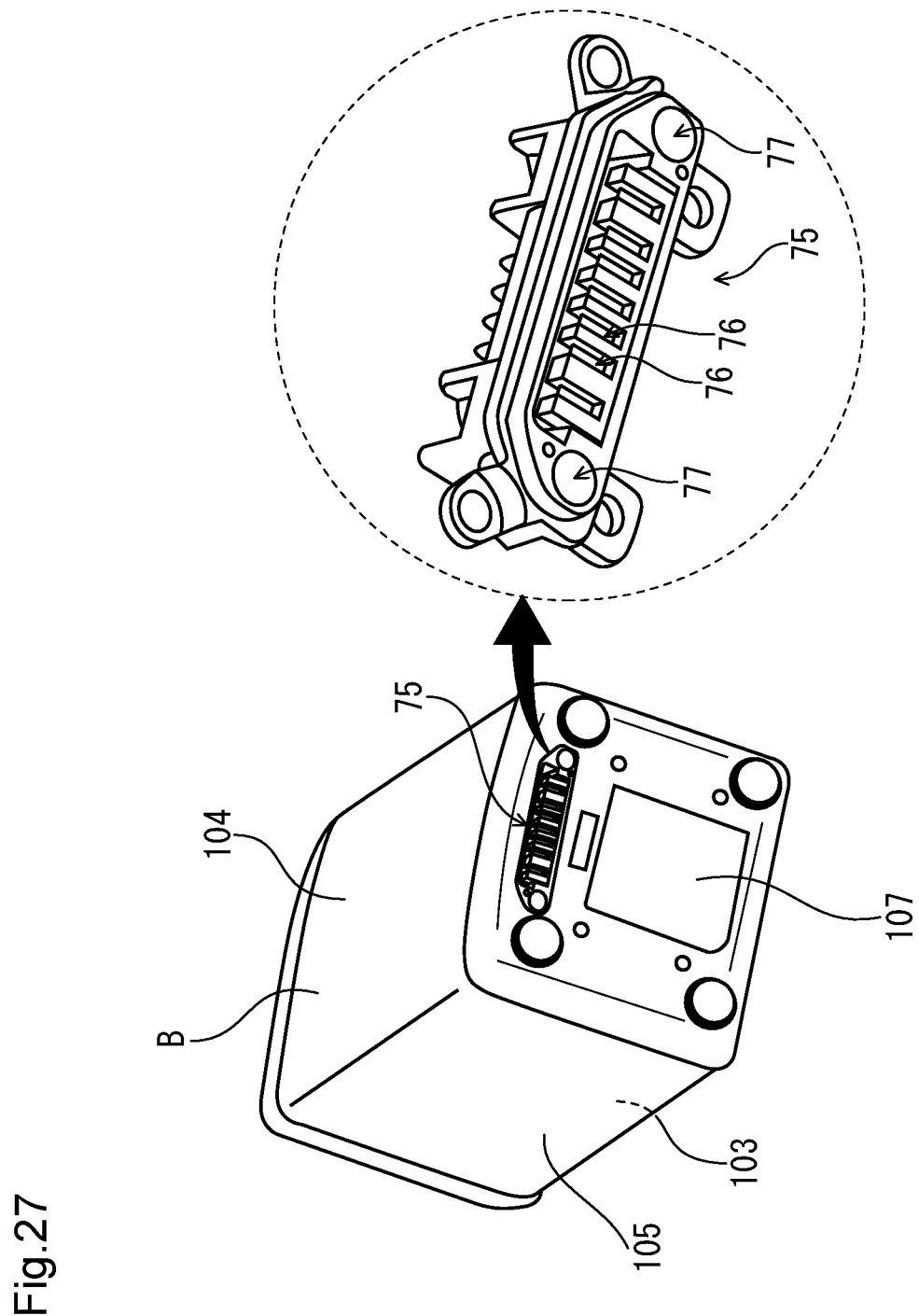
FIG. 27 is an explanatory view of the structure of a battery-side terminal.
Figure 28:
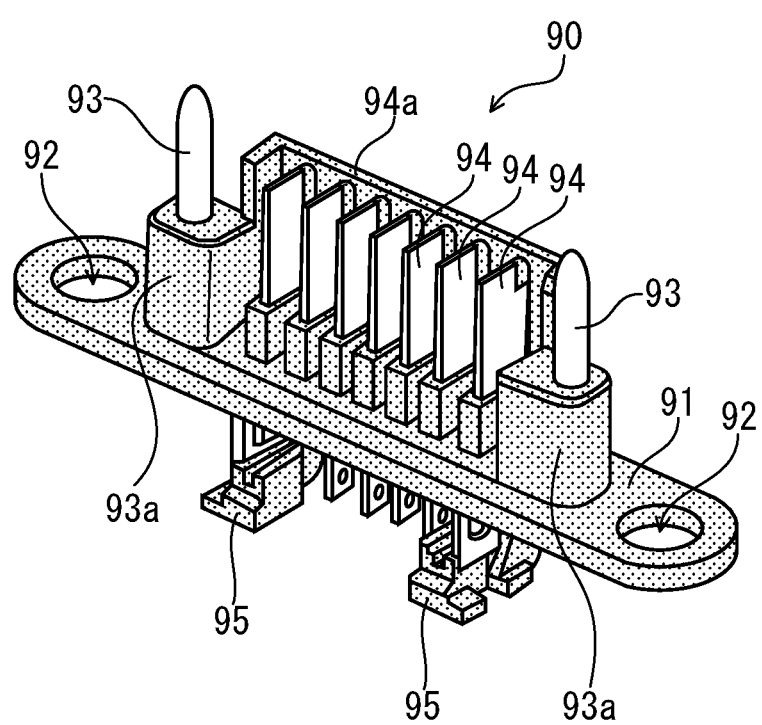
FIG. 28 is a perspective view of a case-side terminal.

FIG. 27 is an explanatory view of a structure of one of the battery-side terminals 75. FIG. 28 is a perspective view of one of the case-side terminals 90. The battery-side terminal 75 is embedded in a lower surface 107 of the battery B at a position near to the outer side in the vehicle width direction. In the battery-side terminal 75, slits 76 and engaging holes 77 are formed. Into the slits 76, seven terminal plates 94 of the case-side terminal 90 are inserted, and into the engaging holes 77, positioning pins 93 supported by support portions 93a at positions outer than the terminal plates 94 are inserted.

In a base plate 91 supporting the terminal plates 94 and the positioning pins 93 of the case-side terminal 90, through holes 92 are formed. Through the through holes 92, support shafts (see FIGS. 29A, 29B, 30A and 30B) that enable the case-side terminal 90 to slide with respect to the terminal holder 74 pass. Protection plates 94a for protecting the terminal plates 94 are provided to stand on the side of the terminal plates 94, and harness holders 95 for supporting harnesses for supplying electric power are provided on the lower surface of the base plate 91.

Figure 29A:
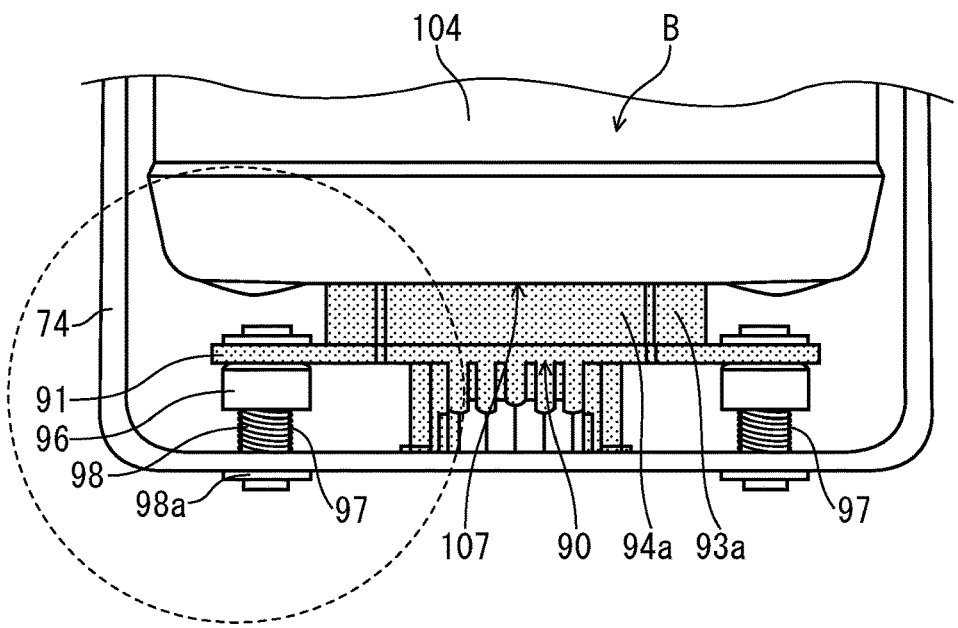
FIGS. 29A and 29B are explanatory views of a structure of a preload mechanism for pressing the case-side terminal against the battery-side terminal (a state where the operation lever is pressed down to some extent).
Figure 29B:
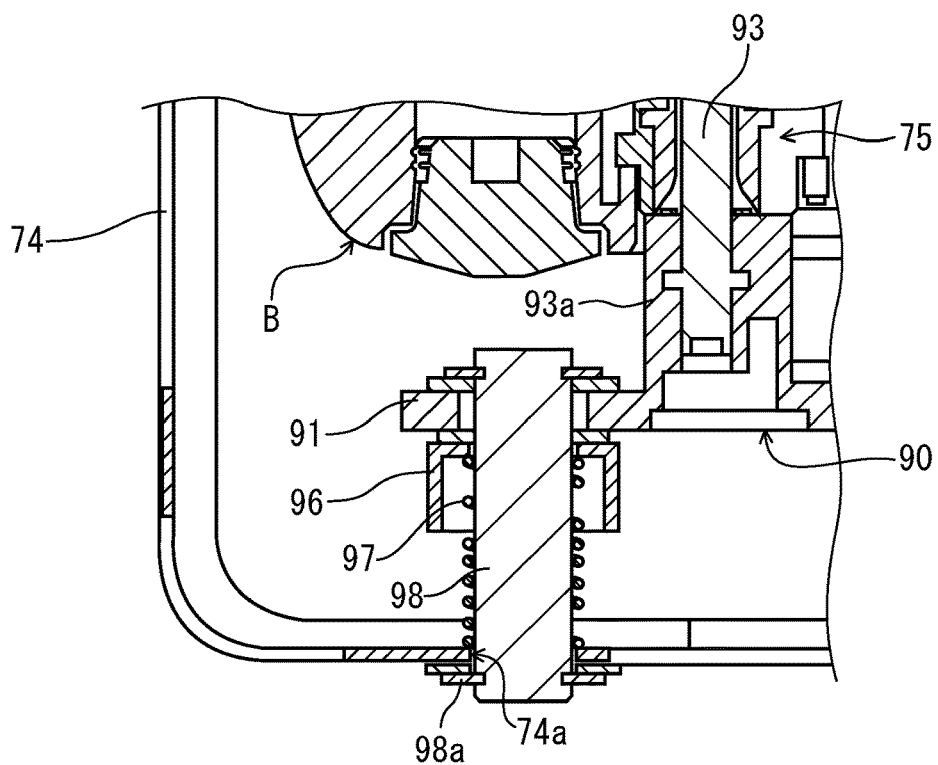
Figure 30A:
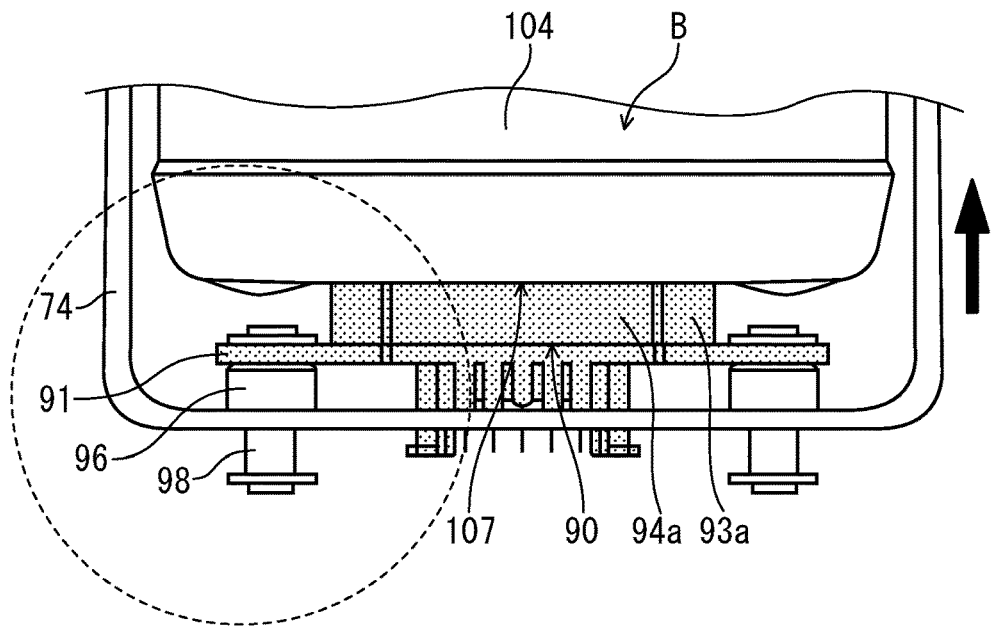
FIGS. 30A and 30B are explanatory views of a structure of a preload mechanism for pressing the case-side terminal against the battery-side terminal (a state where the operation lever is pressed down to the predetermined lowermost position).
Figure 30B:
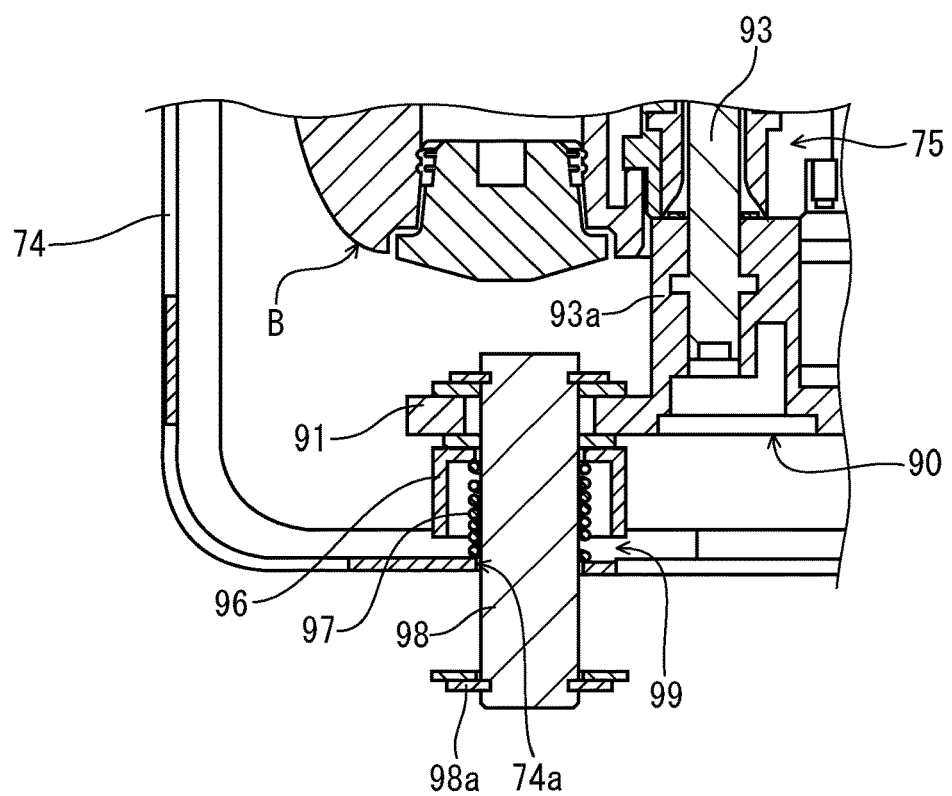

FIGS. 29A, 29B, 30A and 30B are explanatory views of a structure of a preload mechanism for pressing the case-side terminal 90 against the battery-side terminal 75. FIGS. 29A and 29B illustrate a state where the operation lever 60 is pushed down to a position where the case-side terminal 90 is engaged with the battery-side terminal 75, and FIGS. 30A and 30B illustrate a state where the operation lever 60 is further pushed down to the predetermined lowermost position to apply a preload. In FIGS. 29A, 29B, 30A and 30B, 29B and 30B are enlarged cross-sectional views of 29A and 30A in the dashed circles.

The case-side terminal 90 is supported slidably in the vertical direction with respect to the terminal holder 74 by cylindrical support shafts 98 passing through through-holes 74a formed in the terminal holder 74. Coil springs 97 wound around the support shafts 98 are configured to generate an elastic force in a direction of separating the terminal holder 74 and the case-side terminals 90 from each other. The longest distance between the terminal holder 74 and the case-side terminal 90 is limited by snap rings 98a, while the shortest distance between the terminal holder 74 and the case-side terminal 90 is limited by cup members 96 that are disposed on the lower surface of the base plate 91 and that covers the coil springs 97.

In the present embodiment, when the batteries B are stored in the battery case 40 and the operation lever 60 is pushed down, the electrical connection between the case-side terminal 90 and the battery-side terminal 75 is completed before the operation lever 60 reaches the lowermost position of the operation lever 60, and when the operation lever 60 is further pushed down to the lowermost position, the coil spring 97 is contracted to generate the preload. Even in this case, a gap 99 is ensured between the cup members 96 and the terminal holders 74.

As described above, the preload mechanism according to the present embodiment enables generation of a pressing force for pressing the case-side terminal 90 against the battery-side terminal 75 in a state where the case-side terminal 90 is moved to the connected position by disposing the springs 97 between the case-side terminal 90 and the terminal holder 74 for urging the case-side terminal 90 in a direction to press the battery-side terminal 75. As a result, even when the batteries B move in the upward direction of the vehicle body, for example, when the vehicle rides over a large level difference, the electrical connection can be maintained by causing the case-side terminal 90 to follow the movement of the batteries B.

Further, since there are provided the single operation lever 60 that limits the vertical movement of the batteries B when the operation lever 60 is pushed downward in a state where the batteries B are stored in the battery case 40 and the link mechanism L for connecting the operation lever 60 and the terminal holders 74, the vertical movement of the batteries B can be limited by the single operation lever 60, and the attaching and detaching operation of the batteries B is facilitated. Also, since the link mechanism L including a plurality of swing shafts, even when an ineffective stroke occurs in the motion of the operation lever 60, the coil springs 97 absorb the ineffective stroke after the case-side terminals 90 and the battery-side terminals 75 come into contact with each other, so that preloading can be effectively applied to both terminals.

Further, since the support shafts 98, around which the coil springs 97 are wound, are provided as a pair with the case-side terminals 90 interposed therebetween, when sliding mechanisms of the terminal holder 74 are provided on both sides of the case-side terminal 90, the inclination of the case-side terminal 90 is prevented and a smooth sliding motion is enabled. As a result, good electrical connection can be maintained between the case-side terminals 90 and the battery-side terminals 75.

The shape and structure of the batteries, the number and mounting position of the batteries, the shape and structure of the battery case and the operation lever, the shape and structure of the pressing holders and the terminal holders, the shape and structure of the link mechanism and the preload mechanism, and the like are not limited to those described in the above-described embodiment, and various modifications are possible. The battery attaching/detaching structure for the saddle-type vehicle according to the present invention can be applied to saddle-type three-wheel electric vehicles, four-wheel electric vehicles, and the like.

REFERENCE SIGNS LIST

1 electric motorcycle (saddle-type vehicle)
23 seat
40 battery case
45 pressing holder
45*b* pressing portion
45*c* main body portion
45*d* elastic member
49 contact portion
49*a* first contact portion
49*b* second contact portion
51 tapered surface
52 positioning recess
60 operation lever
60*a* grip opening
61 grip portion
61*a* end portion of upper surface of grip portion
62 partition portion
63 positioning plate
63*a* side end surface of positioning plate
63*c* chamfered portion
68 second swing shaft
69 connecting portion
70 arm member
71 first swing shaft
72 third swing shaft
74 terminal holder
74*a* through hole
75 battery-side terminal
84 boss
90 case-side terminal
97 spring
98 support shaft
102 upper surface of battery
103*a* inclined side surface of battery
107 lower surface of battery
B battery
U connected position
D retracted position
L link mechanism

The invention claimed is:

1. A battery attaching and detaching structure for a saddle vehicle, including a plurality of rectangular parallelepiped batteries for supplying electric power to a power source of the saddle vehicle; a battery case in which the batteries are stored; battery-side terminals provided on lower surfaces of the batteries; and case-side terminals engaged with the battery-side terminals, comprising
    terminal holders that support the case-side terminals such that the case-side terminals are movable between a connected position where the case-side terminals are connected to the battery-side terminals and a retracted position where the case-side terminals are separated from the battery-side terminals, wherein
    between the case-side terminals and the terminal holders, springs for urging the case-side terminals in a direction of pressing the battery-side terminals are disposed,
    an operation lever is configured to be vertically slidable along a longitudinal direction of the batteries, and
    the battery attaching and detaching structure for a saddle vehicle further comprises a pressing holder that is swingable and presses upper surfaces of the batteries when the operation lever is moved to a lowermost position.

2. The battery attaching and detaching structure for a saddle vehicle according to claim 1, further comprising
    a link mechanism that connects the operation lever and the terminal holders
    wherein the operation lever is a single operation lever that, when the operation lever is pushed downward in a state where the batteries are stored in the battery case, limits vertical movement of the batteries.

3. A battery attaching and detaching structure for a saddle vehicle, including a plurality of rectangular parallelepiped batteries for supplying electric power to a power source of the saddle vehicle; a battery case in which the batteries are stored; battery-side terminals provided on lower surfaces of the batteries; and case-side terminals engaged with the battery-side terminals, comprising
    terminal holders that support the case-side terminals such that the case-side terminals are movable between a connected position where the case-side terminals are connected to the battery-side terminals and a retracted position where the case-side terminals are separated from the battery-side terminals, wherein
    between the case-side terminals and the terminal holders, springs for urging the case-side terminals in a direction of pressing the battery-side terminals are disposed,
    the battery case is disposed below a seat that is openable and closable and that is provided in the saddle vehicle, and
    a boss positioned above an operation lever is provided on a bottom surface of the seat.

4. The battery attaching and detaching structure for a saddle vehicle according to claim 3, wherein the boss is not in contact with the operation lever in a state where the operation lever is pushed down to a predetermined lowermost position.

5. The battery attaching and detaching structure for a saddle vehicle according to claim 4, wherein
the terminal holders are plate members that are U-shaped and cover lower portions of the case-side terminals,
the terminal holders and the case-side terminals are configured to be slidable in a vertical direction when support shafts that are cylindrical and extend downward from lower surfaces of the terminal holders are inserted into through holes formed in the terminal holders, and
the springs are coil springs wound around the support shafts.

6. The battery attaching and detaching structure for a saddle vehicle according to claim 5, wherein
the support shafts, around which the springs are wound, are provided as pairs each with a corresponding one of the case-side terminals interposed therebetween.

7. The battery attaching and detaching structure for a saddle vehicle according to claim 3, wherein
the terminal holders are plate members that are U-shaped and cover lower portions of the case-side terminals,
the terminal holders and the case-side terminals are configured to be slidable in a vertical direction when support shafts that are cylindrical and extend downward from lower surfaces of the terminal holders are inserted into through holes formed in the terminal holders, and
the springs are coil springs wound around the support shafts.

8. The battery attaching and detaching structure for a saddle vehicle according to claim 6, wherein
the support shafts, around which the springs are wound, are provided as pairs each with a corresponding one of the case-side terminals interposed therebetween.

9. A battery attaching and detaching structure for a saddle vehicle, including a plurality of rectangular parallelepiped batteries for supplying electric power to a power source of the saddle vehicle; a battery case in which the batteries are stored; battery-side terminals provided on lower surfaces of the batteries; and case-side terminals engaged with the battery-side terminals, comprising
terminal holders that support the case-side terminals such that the case-side terminals are movable between a connected position where the case-side terminals are connected to the battery-side terminals and a retracted position where the case-side terminals are separated from the battery-side terminals, wherein
between the case-side terminals and the terminal holders, springs for urging the case-side terminals in a direction of pressing the case-side terminals are disposed,
the number of the batteries is two and the batteries are arranged side by side,
the battery attaching and detaching structure for a saddle vehicle further comprises an operation lever that, when the operation lever is pushed downward in a state where the batteries are stored in the battery case, limits vertical movement of the batteries, and
the terminal holders provided for the two respective batteries are connected to the operation lever.

10. A battery attaching and detaching structure for a vehicle, including a plurality of rectangular parallelepiped batteries for supplying electric power to a power source of the vehicle; a battery case in which the batteries are stored; battery-side terminals provided on lower surfaces of the batteries; and case-side terminals engaged with the battery-side terminals, comprising
terminal holders that support the case-side terminals such that the case-side terminals are movable between a connected position where the case-side terminals are connected to the battery-side terminals and a retracted position where the case-side terminals are separated from the battery-side terminals, wherein
between the case-side terminals and the terminal holders, springs for urging the case-side terminals in a direction of pressing the battery-side terminals are disposed,
an operation lever is configured to be vertically slidable along a longitudinal direction of the batteries, and
the battery attaching and detaching structure for the vehicle further comprises a pressing holder that is swingable and presses upper surfaces of the batteries when the operation lever is moved to a lowermost position.

* * * * *